US008687479B2

(12) United States Patent
Li et al.

(10) Patent No.: US 8,687,479 B2
(45) Date of Patent: Apr. 1, 2014

(54) METHODS AND APPARATUS FOR CHANNEL ESTIMATION AND RATE FEEDBACK IN A PEER TO PEER NETWORK

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1452 days.

(21) Appl. No.: 12/166,675

(22) Filed: Jul. 2, 2008

(65) Prior Publication Data

US 2009/0016285 A1  Jan. 15, 2009

Related U.S. Application Data

(60) Provisional application No. 60/948,985, filed on Jul. 10, 2007.

(51) Int. Cl.
*H04J 11/00* (2006.01)

(52) U.S. Cl.
USPC .......................................... 370/208; 370/332

(58) Field of Classification Search
USPC ......... 370/431, 203, 208, 436, 437, 462, 464, 370/471, 478, 319, 329, 332, 344, 349
See application file for complete search history.

(56) References Cited

U.S. PATENT DOCUMENTS

| 7,047,016 | B2 | 5/2006 | Walton et al. |
| 7,116,981 | B2 * | 10/2006 | Jeon et al. ..................... 455/450 |
| 7,346,018 | B2 | 3/2008 | Holtzman et al. |

| 2004/0110477 | A1 | 6/2004 | Nishimura et al. |
| 2004/0198235 | A1 | 10/2004 | Sano |
| 2005/0130687 | A1 | 6/2005 | Filipovic et al. |
| 2006/0269005 | A1 | 11/2006 | Laroia et al. |
| 2007/0025460 | A1 | 2/2007 | Budianu et al. |

(Continued)

FOREIGN PATENT DOCUMENTS

| JP | 2005253020 A | 9/2005 |
| WO | 0048354 | 8/2000 |
| WO | 2006124810 | 11/2006 |
| WO | 2007053954 | 5/2007 |

OTHER PUBLICATIONS

International Search Authroity—PCT/US08/069443, International Search Authority—European Patent Office—Jan. 28, 2009.

(Continued)

*Primary Examiner* — Brenda H Pham
(74) *Attorney, Agent, or Firm* — James K. O'Hare

(57) ABSTRACT

Methods and apparatus for performing channel estimation and reporting back channel information or other information such as a suggested traffic transmission rate are described. A signal including a pilot signal of interest is received. Portions of the signal corresponding to the pilot signal are analyzed to determine if any of the portions, e.g., signal portions corresponding to individual tone symbols used to communicate the pilot signal, were subject to excessive interference, such as might be the result of collisions, rendering the signal portions unreliable. Signal sub-portions determined to be unreliable are excluded from a determination of the amount of pilot signal energy that was received. Signal interference is determined from a portion of the received signal on which the pilot signal was not transmitted. Channel information in the form of information and/or a suggested traffic rate may be reported back to the device which transmitted the pilot signal.

28 Claims, 10 Drawing Sheets

(56) References Cited

U.S. PATENT DOCUMENTS

| | | |
|---|---|---|
| 2007/0025480 A1 | 2/2007 | Tackin et al. |
| 2007/0076807 A1 | 4/2007 | Jin et al. |
| 2007/0274477 A1 | 11/2007 | Chen |
| 2007/0291636 A1 | 12/2007 | Rajagopal et al. |
| 2008/0123602 A1* | 5/2008 | Beek et al. .................... 370/336 |
| 2008/0298510 A1 | 12/2008 | Jonsson |
| 2009/0019169 A1 | 1/2009 | Li et al. |
| 2009/0129258 A1 | 5/2009 | De Courville et al. |
| 2009/0262699 A1* | 10/2009 | Wengerter et al. ............ 370/330 |

OTHER PUBLICATIONS

Written Opinion—PCT/US08/069443, International Search Authority—European Patent Office—Jan. 28, 2009.

Taiwan Search Report—TW097126137—TIPO—Aug. 28, 2012.

* cited by examiner

METHODS AND APPARATUS FOR CHANNEL ESTIMATION AND RATE FEEDBACK IN A PEER TO PEER NETWORK

RELATED APPLICATIONS

The present application claims the benefit of U.S. Provisional Patent Application 60/948,985, filed on Jul. 10, 2007 titled "METHODS AND APPARATUS RELATING TO PEER TO PEER COMMUNICATIONS" which is assigned to the assignee hereof and which is hereby expressly incorporated by reference in its entirety.

FIELD

Various embodiments relate to wireless communications methods and apparatus and, more particularly, to wireless communications methods and apparatus that support communication channel estimation where one or more pilot signals from different device may act as interference to one another.

BACKGROUND

In peer to peer systems, e.g., ad hoc peer to peer systems, resource utilization is normally controlled by individual peer devices often without the aid of a centralized controller commonly used in more conventional cellular networks. Various approaches to resource selection may be taken with the selection of resources being performed by the individual devices or sets of communications peers which are communicating in a manner that is intended to avoid collisions, e.g., multiple nearby devices transmitting on the same communications resource at the same time.

Resource selection techniques, which may include selecting sets of resources to use from a large set of possible communications resources, e.g., sets of tone-symbols or codes, reduce the risk that two nearby transmissions will collide. However, collisions may still occur. Since devices can select from a large number of different sets of resources, in many cases, even when there is a collision, only a small portion of the resources being used by the two devices will overlap resulting in a collision of only a portion of the signals being transmitted by the devices at a given time.

Unfortunately, collisions on resources, e.g., tone symbols on which energy detection is being applied, e.g., for purposes of channel estimation or for purposes of positional decoding, can result in errors when attempting to measure the strength of a received signal or when trying to detect the presence of signal energy corresponding to a signal of interest on a communications resource.

In view of the above discussion, it should be appreciated there is a need for methods and apparatus which can be used to process pilot signals received from a peer device with which the receiving device is trying to communicate. It would be desirable if the receiving device was able to generate useful results, e.g., a channel estimate, SIR, SNR or some other useful value such as a suggested transmission rate.

SUMMARY

Methods and apparatus for performing channel estimation and reporting back channel information or other information such as a suggested traffic transmission rate are described. A signal including a pilot signal of interest is received. Portions of the signal corresponding to the pilot signal are analyzed to determine if any of the portions, e.g., signal portions corresponding to individual tone symbols used to communicate the pilot signal, were subject to excessive interference, such as might be the result of collisions, rendering the signal portions unreliable. Signal sub-portions determined to be unreliable are excluded from a determination of the amount of pilot signal energy that was received. Signal interference is determined from a portion of the received signal on which the pilot signal was not transmitted. Depending on the embodiment channel information in the form of a channel estimate, SIR, SNR is communicated and/or a suggested traffic rate is communicated back to the device which transmitted the pilot signal.

A communications method implemented in one exemplary embodiment includes the steps of: identifying a first subset of communications resources out of a larger set of communications resources, receiving on the larger set of communications resources a signal, determining based on the received energy corresponding to individual sub-portions of the received signal if one or more sub-portions of the received signal are reliable, said sub-portions corresponding to a first portion of said signal having been received on the first subset of communications resources and generating a channel quality estimate based on the sub-portions determined to be reliable and a second portion of said signal corresponding to communication resources in said larger set of communications resources which are not included in said first subset.

A communications device implemented in one exemplary embodiment includes a resource identification module configured to identify a first subset of communications resources out of a larger set of communications resources; a receiver configured to receive a signal on the larger set of communications resources; a reliability determination module configured to determine based on the received energy corresponding to individual sub-portions of the received signal if one or more sub-portions of the received signal are reliable, said signal sub-portions corresponding to a first portion of said signal having been received on the first subset of communications resources; and a channel quality estimate generation module configured to generate a channel quality estimate based on the sub-portions determined to be reliable and a second portion of said signal corresponding to communication resources in said larger set of communications resources which are not included in said first subset.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
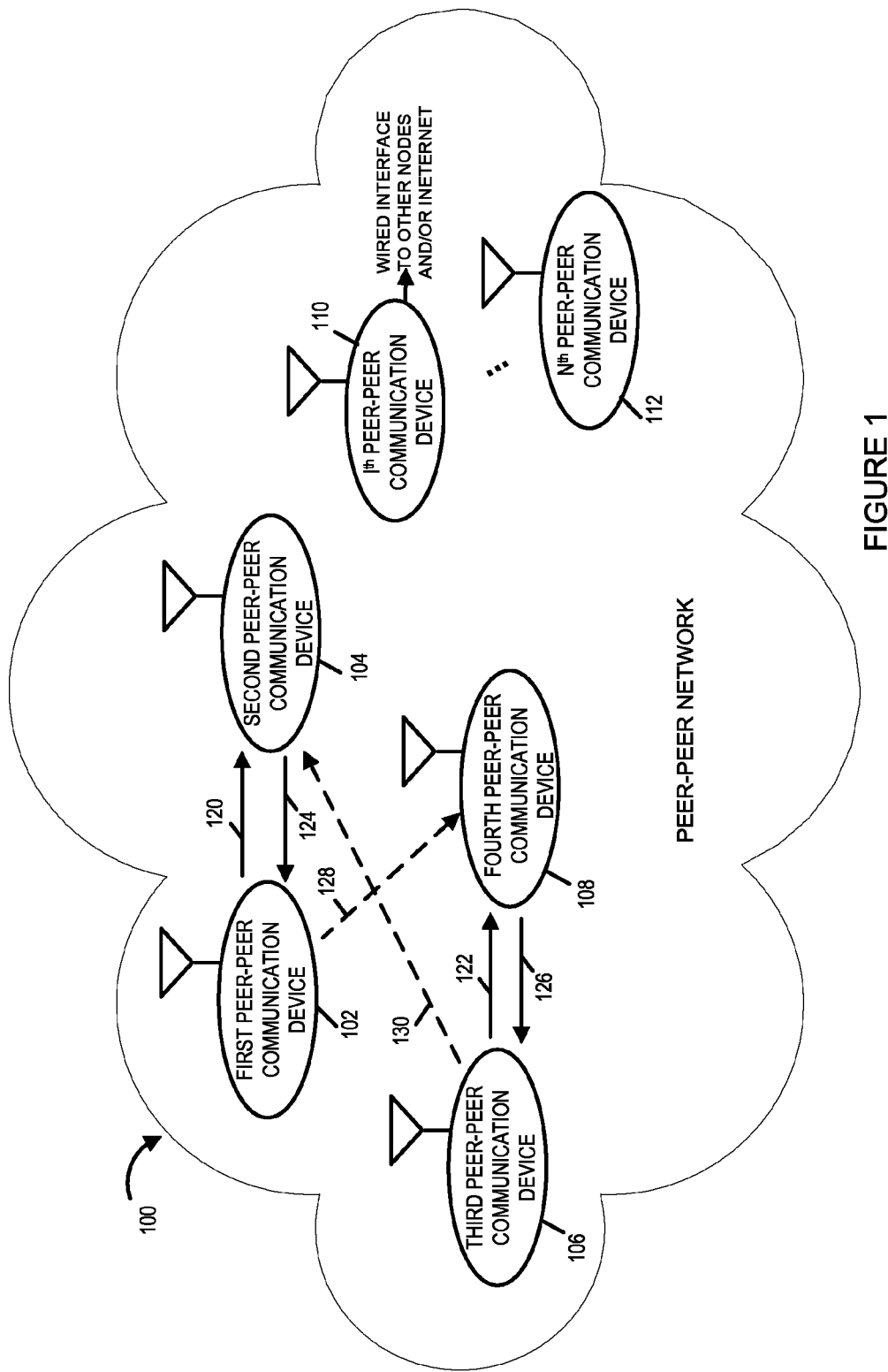
FIG. 1 is a drawing of an exemplary peer to peer communications network, e.g., an ad-hoc peer to peer communications network in a local region, in accordance with one exemplary embodiment.

FIG. 1 is a drawing of an exemplary peer to peer communications network 100, e.g., an ad-hoc peer to peer communications network in a local region, in accordance with one exemplary embodiment. Exemplary communications network 100 includes a plurality of peer to peer wireless communications devices (first device 102, second device 104, third device 106, fourth device 108, $I^{th}$ device 110, ..., $N^{th}$ device 112). The wireless communications devices (102, 104, 106, 108, ..., 110, 112) support various signaling between peers, e.g., peer discovery signals, pilot signals, transmission request signals, etc., and data transmissions between peers. Some of the peer to peer communications devices, e.g., $I^{th}$ device 110, also include a wired interface, which couples the peer to peer communications device to other nodes and/or the Internet. The wired interface is in addition to a wireless communications interface. Some of the peer to peer communications devices 102, 104, 106, ..., 112 are mobile communications devices, e.g., handheld mobile communications devices.

In the network 100, there may be multiple peer to peer communications devices that wish to communicate control information and/or support interference estimation to facilitate communication of traffic data in a traffic slot. Consider for example an exemplary embodiment where a first peer to peer communications device, e.g., the first device 102 sends a pilot signal, e.g., signal 120, to another peer to peer communications device, e.g., the second device 104 with which it is communicating, e.g., for channel and interference measurement. In response, the second device 104 may perform channel quality estimation and interference measurement based on the received pilot signal and sends back a signal 124, e.g., a rate feedback, to the first device 102. While the first and second devices 102, 104 are exchanging signals, the third peer to peer communications device 106 may send a pilot signal, e.g., signal 122, to the fourth device 108. In response, the fourth device 108 may send back a signal 126, e.g., a rate feedback, to the third device 106.

The first device 102 may transmit a pilot signal to the second device 104 on a set of communications resources, e.g., OFDM tone-symbols which are available in an OFDM symbol. Similarly, the third device 106 may transmit a pilot signal to the fourth device 108 on a set of communications resources, e.g., OFDM tone-symbols. While the first and third devices 102, 106 prefer, and commonly do, use different sets of resources to transmit pilot signals, given the absence of a central controller, the first and third devices may unintentionally select resources, e.g., tone-symbols, some of which may collide. Accordingly, it should be appreciated that since the communication resources are shared, a collision is possible. Thus, it is possible that transmission of signal(s) by the first communications device 102 may appear as interference to one or more of the other communications devices. For example, signal transmissions by the first 102 may be viewed by the fourth device 108 as interference to signal 122 being received by the fourth device 108 from the third device 106. Similarly, signal 122 from the third device 106 may be viewed as an interference signal 130 which can interfere with communications between the first and second devices 102, 104.

In some embodiments, each communicating pair of peer to peer devices, pseudo-randomly selects a subset of resources from the total number of N communication resources available, e.g., to send and/or receive their respective pilot signals. Two exemplary communicating pairs, for example, may be the first device 102 and the second device 104 pair, and, third device 106 and the fourth device 108 pair. For example, the selected subset of communications resources may, and sometimes does, correspond to a connection identifier corresponding to a peer to peer communications device. In some other embodiments, a peer to peer communications device, e.g., first device 102, may select a subset of communication resources corresponding to a device identifier. Assuming that total number of N communication resources in an OFDM transmission symbol is large and/or the number of devices in a geographic region is low, there may be a low probability of a collision on the selected communication resources. The first device 102 and the third device 106, typically select their respective sets of communication resources, e.g., OFDM tone-symbols, independently. However, some level of coordination may be employed to further reduce the risk of selecting the same sets. However in many cases the risk of collisions will not be avoided entirely, particularly if a device is moving and/or devices are entering/leaving a geographic region where communication is occurring.

Figure 2:
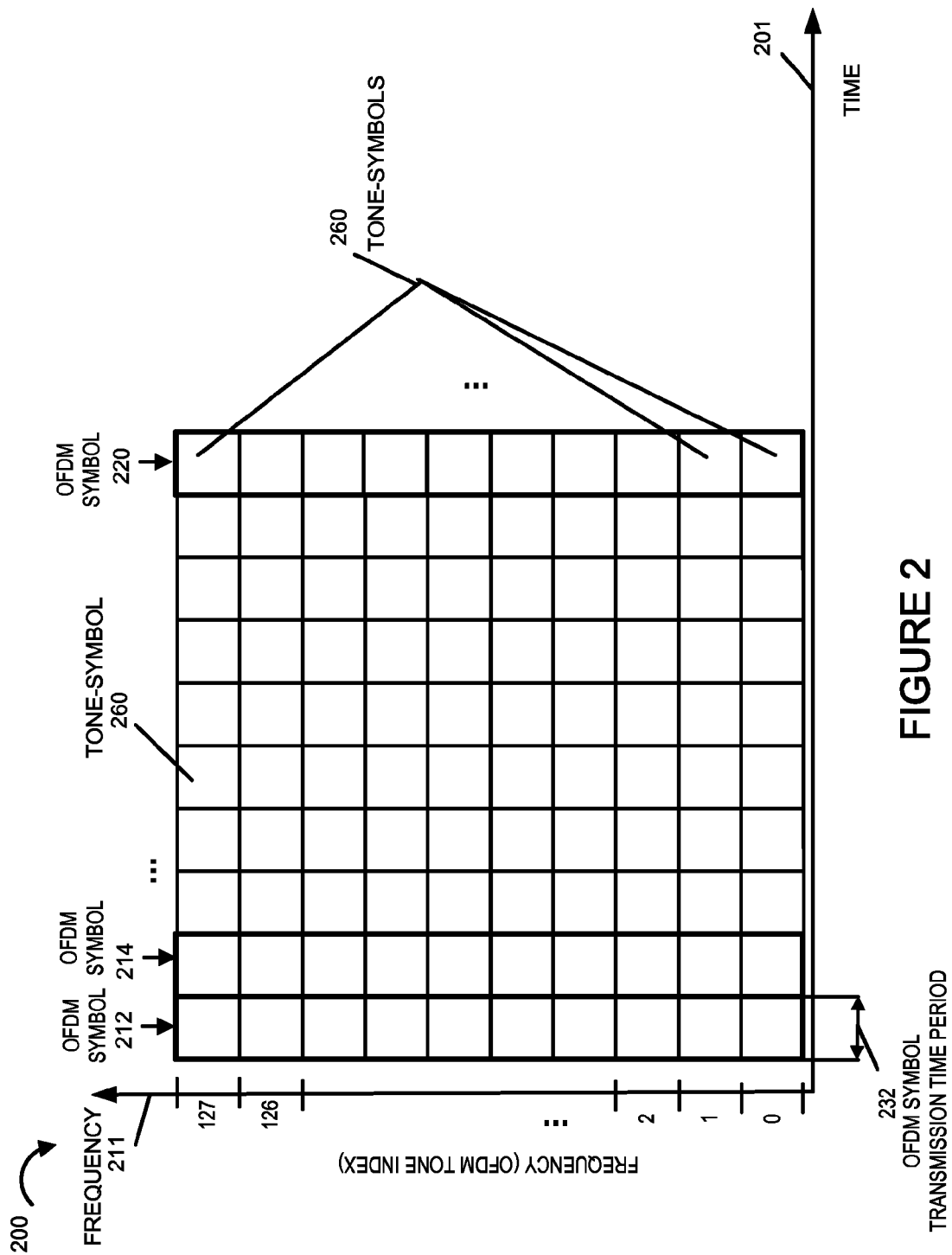
FIG. 2 illustrates exemplary air link communications resources which can be used to communicate a pilot signal.

FIG. 2 is a drawing 200 illustrating exemplary air link communications resources which can be used, for example, to communicate a pilot signal, e.g., from the first device 102 to the second device 104. Consider an exemplary embodiment of a frequency division multiplexing system, e.g., an OFDM system. In one such system, information may be transmitted in a symbol-by-symbol manner. In one such embodiment during a symbol transmission period, available bandwidth is divided into a number of tones, each of which can be used to carry information.

In FIG. 2, the horizontal axis 201 represents time and the vertical axis 211 represents frequency. A vertical column represents an OFDM symbol having a duration corresponding to one symbol transmission time period. A plurality of OFDM symbols, e.g., OFDM symbol 212, OFDM symbol 214, and OFDM symbol 220 are shown. Each of the OFDM symbols includes multiple tones corresponding to a given symbol transmission time period. An individual OFDM symbol transmission time period is shown in FIG. 2 and identified by reference number 232. This time period 232 corresponds to the time used to transmit one OFDM symbol. In some embodiments, an OFDM symbol includes 128 tones. However different embodiments use other number of tones. Each small box 260 represents a tone-symbol, which is the air link resource of a single tone over a symbol transmission time period. Each of the individual tone-symbols 260 is an air link communications resource. The air link communication resources can be measured in terms of degrees of freedom, where a degree of freedom is the minimum unit of resource which may be used for communication. In an OFDM system, a degree of freedom can be the phase or amplitude of a tone-symbol. In the case where a tone-symbol communicates information using one of phase and amplitude (but not both) a tone-symbol corresponds to a single degree of freedom. Another example is of a CDMA system, where a degree of freedom can be a spreading code. It should be appreciated that in general, the degrees of freedom in a given system are orthogonal with each other.

Figure 3:
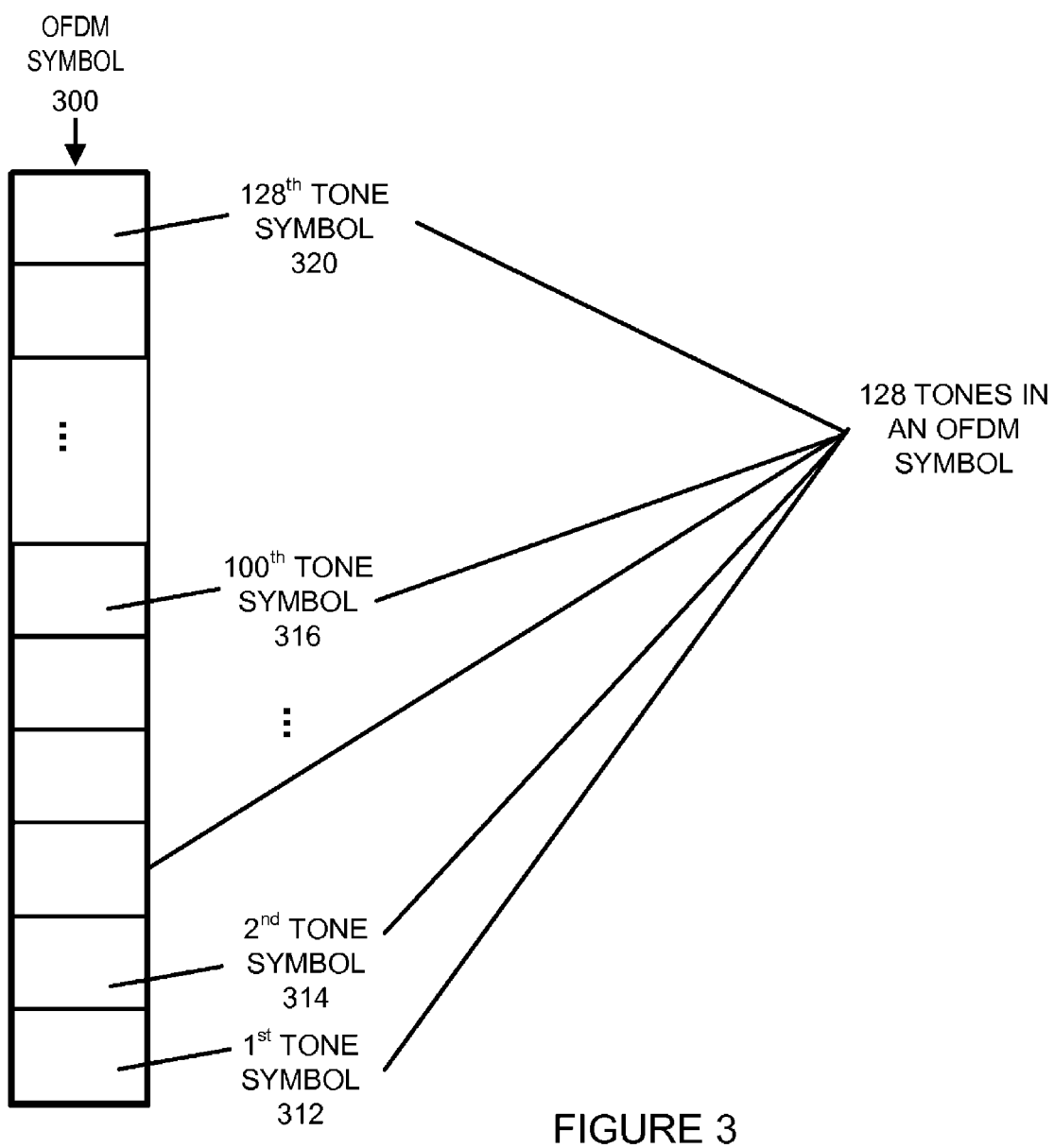
FIG. 3 illustrates an exemplary OFDM symbol, in accordance with an exemplary embodiment.

FIG. 3 illustrates an exemplary OFDM-symbol 300, in accordance with an exemplary embodiment. The OFDM-symbol 300 can be any of the OFDM symbols 212, 214, ..., 220 shown in FIG. 2. As shown in FIG. 3, the exemplary OFDM symbol 300 includes a plurality of individual tone-symbols. In the exemplary embodiment shown in FIG. 3, the OFDM symbol 300 includes 128 tone-symbols, e.g., $1^{st}$ tone-symbol 312, $2^{nd}$ tone-symbol 314, ..., $128^{th}$ tone symbol 320. However, it should be appreciated that an OFDM symbol is not restricted to have only 128 tone-symbols, rather it may have more or less than 128 tone-symbols in some other embodiments. Each of the individual tone-symbols represents a communications resource. In some embodiments, communications devices seeking to communicate with each other use a portion of the communications resources in an OFDM symbol, e.g., tone-symbols. The tone-symbols may be used by the communication devices to communicate, e.g., peer discovery signals, pilot signals, rate feedback signals, transmission request signals, etc. Thus, in some embodiments, one or more peer to peer communications devices may be sending pilot signals to other peer to peer communications devices in a network, e.g., for channel and interference measurement. In some other embodiments, one or more peer to peer communications devices may be sending other signals including, e.g., rate feedback information, channel quality indicator, and/or simply ACK/NAK bit(s), to other peer to peer communications devices in the network. In accordance with an exemplary embodiment, a communications device, e.g., first device 102 may send the pilot signal to, e.g., second device 104, using a sub-set of tone-symbols. In some embodiments the sub-set of tone-symbols selected for communicating the pilot signal and/or other signals may be selected, e.g., pseudo randomly by the pair of communicating devices or by some other technique intended to reduce the risk of collision.

Figure 4:
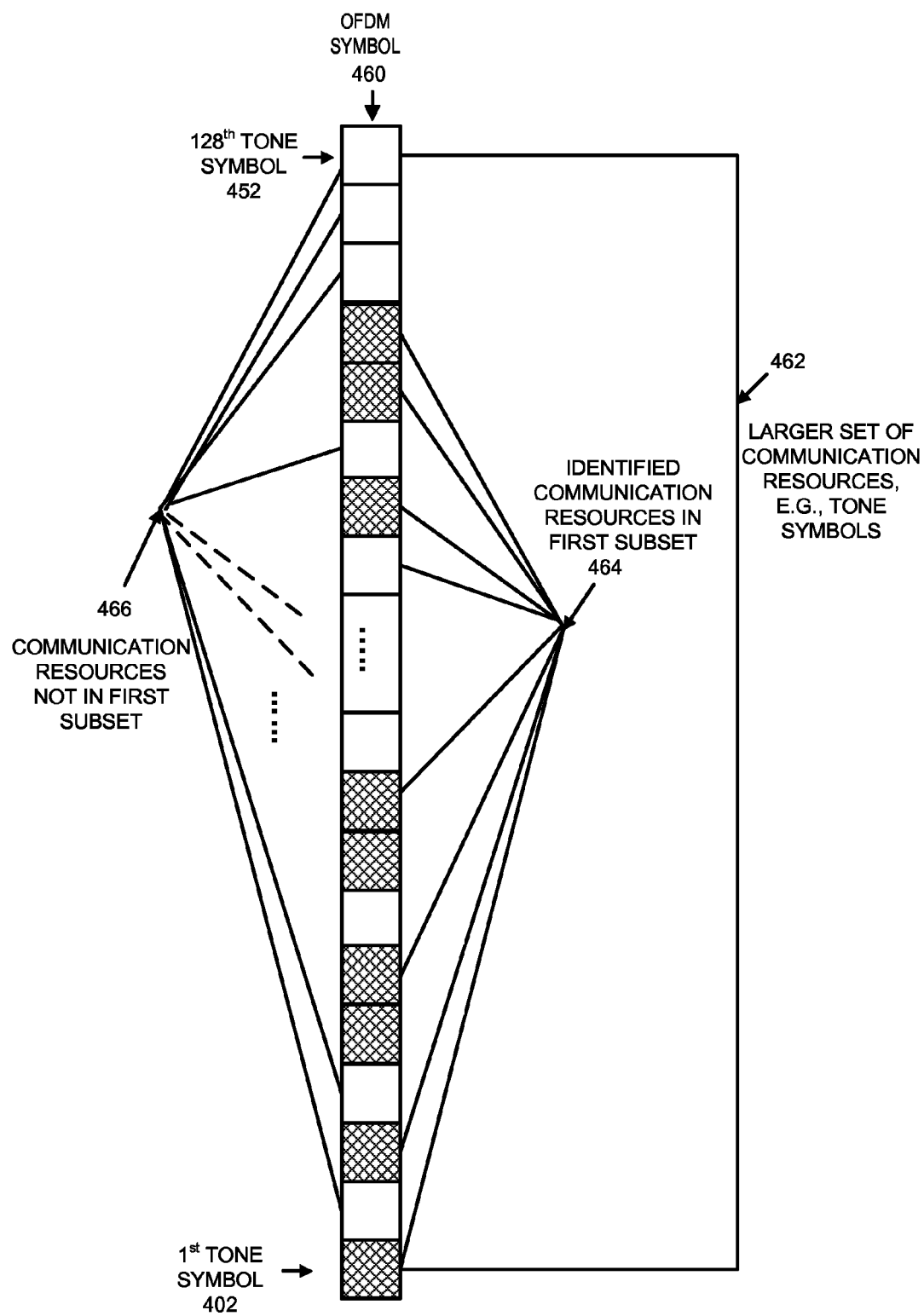
FIG. 4 is a more detailed drawing of an exemplary OFDM symbol showing various tone-symbols, in accordance with an exemplary embodiment.

FIG. 4 will be used to explain how resources, e.g., OFDM tone-symbols may be grouped into different subsets. FIG. 4 illustrates an exemplary OFDM symbol 460 and arrangement of communications resources therein, e.g., arrangements of individual tone-symbols, included in the exemplary OFDM symbol 460, in accordance with an exemplary embodiment. The OFDM-symbol 460 can be any of the OFDM symbols 212, 214, ..., 300, shown in FIGS. 2 and 3.

As shown in FIG. 4, the exemplary OFDM symbol 460 includes a plurality of individual tone-symbols. In the exemplary embodiment shown in FIG. 4, the OFDM symbol 460 includes 128 tone-symbols, e.g., $1^{st}$ tone-symbol 402, ..., $128^{th}$ tone symbol 452. In accordance with an exemplary embodiment, the exemplary OFDM symbol 460 is divided into a number of subsets of communications resources, e.g., sets of tone-symbols. A larger set of communications resources as shown and identified by reference number 462 includes, for example, the full set of 128 tone-symbols. In some embodiments, the larger set may include lesser number of tone-symbols than the full set of 128 tone-symbols. The exemplary OFDM symbol 460 also includes a first portion, e.g., a first subset of communications resources 464, which is a subset of the larger set of communications resources 462. In FIG. 4 cross hatching is used to indicate tone-symbols corresponding to subset 464. Note that tone-symbols in subset 464 may, but need not be, adjacent tone symbols in the OFDM symbol 460. In some embodiments, the first subset 464 may include, e.g., 10 tones. The remaining portion of the communication resources in the OFDM symbol 460 is represented by communication resources not in the first subset and is identified by reference number 466. Such tone-symbols are not shaded/cross hatched to distinguish them from tone-symbols in the first subset 464. Note that the first portion and the remaining portion of the OFDM symbol may be made up of non-contiguous sub-portions each corresponding to one or more OFDM tone-symbols.

A signal received on resources corresponding to an OFDM symbol may include one or more portions where the individual portions correspond to the different sets of tone symbols which make up the OFDM symbol. Thus a received signal may include, for example, a first signal portion corresponding to a first subset of tone-symbols and a second signal portion corresponding to a second, e.g., different, subset of tone-symbols. The first signal may communicate e.g. a signal of interest such as, for example, a pilot signal and/or rate feedback signal. While one portion of a signal may include a signal of interest, another portion of the signal may not include a signal of interest and appears as, e.g., background noise, to the receiving device. As should be appreciated resources on which a signal of interest are received may also include noise in addition to the signal of interest. Depending on the level of noise, the noise may render a portion of a signal, e.g., tone-symbol, unreliable.

In accordance with an exemplary embodiment, the first subset of communication resources 464 is identified by a device from the larger set of communication resources 462. A signal is received by a communications device, e.g., second communications device 104, on the larger set of communications resources 462. In some embodiments, the received signal includes multiple signal portions, each portion corresponding to a different set of communication resources. A portion of the received signal may communicate, e.g., a pilot signal and/or other signal, communicated from another peer communications device. In some embodiments, a portion of the received signal may, and sometimes is, received on the first subset of communications resources 464. The portion of the received signal received on first subset 464 may have, e.g., one or more sub-portions. The sub-portions of the received signal normally have some received energy associated with each individual sub-portion of the received signal. Accordingly, a received energy level can be determined for individual sub-portions, e.g., portions corresponding to a tone-symbol. In some embodiments, each sub-portion may be, e.g., a single tone-symbol. In accordance with an exemplary embodiment, a determination based on the received energy corresponding to individual sub-portions of a portion of a received signal corresponding to a first subset is made. The determination is made, in some embodiments, in order to check if one or more sub-portions of the received signal is reliable. The criteria of detecting reliability of one or more sub-portions of the received signal will be discussed later in detail in the sections that follow.

Figure 5:
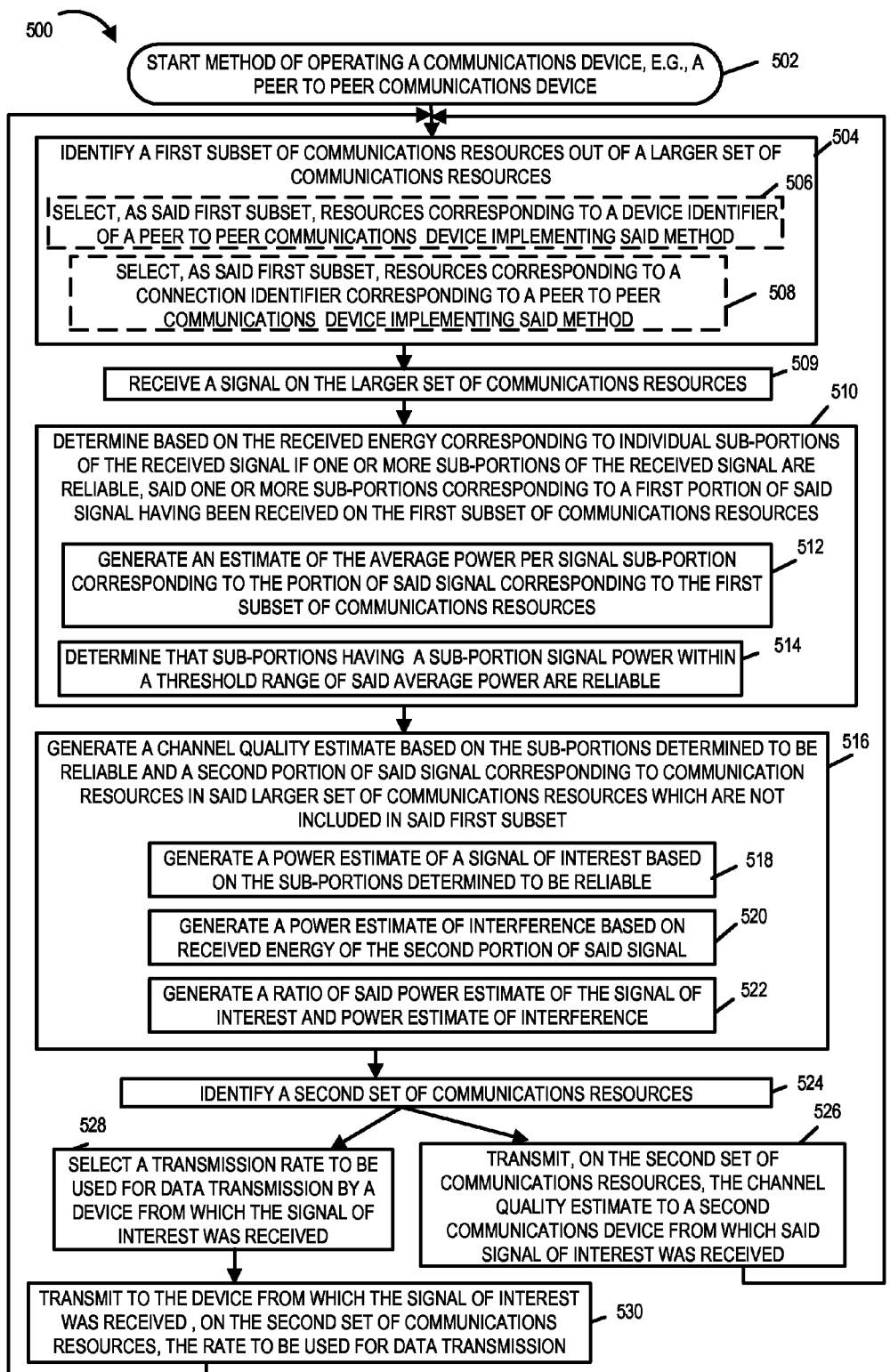
FIG. 5 is a flowchart of an exemplary communications method in accordance with an exemplary embodiment.

FIG. 5 is flowchart 500 of an exemplary communications method of operating a communications device, e.g., second device 104, in a peer to peer communications system to generate a channel estimate and then to communicate the channel estimate and/or a rate indicator based on the channel estimate to another device. In an exemplary embodiment, a channel quality estimate is generated by the communications device in the presence of interference through the use of a subset of communications resources, e.g., tone-symbols, which may be selected for channel estimation purpose, based on, e.g., an identifier corresponding to the communication device. In various embodiments, communications resources may be individual tone-symbols. Operation of the exemplary method starts in step 502 where the communications device, e.g., second device 104, is powered on and initialized. Operation proceeds from start step 502 to step 504.

In step 504 the communications device 104 identifies a first subset of communications resources, e.g., first subset 464, out of a larger set of communications resources, e.g., larger set 462. This first subset 464 may be detected according to a method known to both a transmitting device and the receiving device based on information, e.g., an identifier known to both sending and receiving devices 102, 104. In this manner the receiving device 104 can identify resources, e.g., tone-symbols, used by the first device 102 to communicate a signal of interest, e.g., a pilot signal, to the second device 104. In some embodiments, the step 504 includes sub-step 506 while in other embodiments sub-step 508 is used. In some of the embodiments sub-step 506 may be performed while in some other embodiments sub-step 508 may be performed. In sub-step 506, the second device 104 selects, as the first subset, resources corresponding to a device identifier. The device identifier may be, e.g., an identifier associated with the second device 104. In embodiments where sub-step 508 is used, the second device 104 selects, as the first subset, resources corresponding to a connection identifier corresponding to the second device 104. The connection identifier may be, e.g., an identifier used to identify a communications connection between the second device 104 and the first device 102.

Regardless of the sub-steps used to implement step 504, operation proceeds from step 504 to step 509. In step 509, the second device 104 receives a signal on the larger set of communications resources 462. The received signal includes, e.g., a signal of interest which was transmitted on some communications resources and interference, e.g., background noise on other communication resources. As discussed earlier, the received signal may include one or more portions, e.g., with a first portion corresponding to the signal of interest, e.g., a pilot signal and/or other signal and a second portion which is interference. The first and second signal portions may each correspond to multiple non-contiguous tone-symbols. The operation proceeds from step 509 to step 510 wherein the second device 104 determines, based on the received energy corresponding to individual sub-portions of the received signal, if one or more sub-portions of the received signal used to communicate a signal of interest are reliable. The sub-portions, e.g., tone-symbols, corresponding to the first portion of said signal having been received on the first subset of communications resources. Thus in step 510, a determination is made if one or more sub-portions, e.g., tone-symbols, of the first subset, is unreliable, e.g., polluted due to noise and/or collision such as may be the case where there is a collision between signals transmitted by multiple devices. For example, it is possible that a collision may have occurred on a tone-symbol in the first subset. The collision may be due to some other peer device using the same tone-symbol, e.g., for transmitting a signal. Tone-symbols which are affected by an unacceptable level of noise, e.g., as indicated by a noise or power threshold being exceeded are regarded as unreliable while the tone-symbols and corresponding signal sub-portions corresponding to the signal of interest on which unacceptable level of noise, e.g., interference, is not detected are considered to be determined to be reliable.

In some, but not all embodiments, step 510 includes sub-steps 512 and 514. In sub-step 512, the second device 104 generates an estimate of the average power per signal sub-portion corresponding to the portion of said signal, e.g., the signal of interest, corresponding to the first subset of communications resources. For example, the second device 104 generates an estimate of the average power received on sub-portions, e.g., the tone-symbols, corresponding to the first subset 464. In sub-step 514, the second device 104 makes a determination that sub-portions, e.g., tone-symbols, having sub-portion signal power within a threshold range of the average power (average power per signal sub-portion generated in sub-step 512) are reliable. For example, in some embodiments the second device 104 may compare the signal power on tone-symbols corresponding to the first subset 464 with the generated average power level. Thus, the sub-portions, e.g., signal portion corresponding to individual tone-symbols having signal power within, e.g., a predetermined range, may be determined to be reliable. The other tone-symbols which are outside the threshold range, may be regarded as unreliable. Consider for example that a signal portion received on a tone-symbol which has been used by another device at the same time might have twice the power of a signal portion on which a collision has not occurred. Tone sets selected by different devices may have a few overlapping tone-symbols but the sets are designed to make a full overlapping in tone-symbols highly unlikely or impossible where the subset is selected by the devices using different device or connection ID's to select the tone subsets. In accordance with various exemplary embodiments, the tone-symbols which are regarded as unreliable are not used in various channel estimation calculations, e.g., SNR etc. The operation proceeds from step 510 which includes sub-steps 512 and 514, to step 516.

In step 516, the second device 104 generates a channel quality estimate based on the sub-portions determined to be reliable and a second portion, e.g., a portion which has background noise but does not have a signal of interest, of said signal corresponding to communication resources in said larger set of communications resources which are not included in said first subset. The second portion of the received signal may be, e.g., a signal portion which is not of interest to the device 104. Thus the second portion may be regarded as including only interference. In some embodiments, during the step of generating the channel quality estimate, the second device 104 may, and sometimes does, perform sub-steps 518, 520 and 522. In sub-step 518 the second device 104 generates a power estimate of a signal of interest based on the sub-portions determined to be reliable. For example, based on the signal of interest, e.g., pilot signal, received on the first subset of communications resources. The first subset of resources may provide both reliable and unreliable sub-portions. The power estimate of the signal of interest may be generated based on the signal power of reliable sub-portions with unreliable sub-portions being excluded from the determination. In sub-step 520, the second device 104 generates a power estimate of interference based on received energy of the second portion of the signal. In sub-step 522 the second device 104 generates a ratio of said power estimate of the signal of interest and power estimate of interference, e.g., a signal to interference ratio.

Operation proceeds from step 516 which may include sub-steps 518, 520 and 522, to step 524. In step 524, the second device 104 identifies a second set of communications resources. The second set of communications resources may be, e.g., communications resources belonging to same or different frequency band used for receiving the signal. For example, the first set of resources may correspond to a set of tone-symbols used for pilot signals and other signals while the second set of communications resources may correspond to a different frequency band used for sending feedback or other information used to facilitate transmissions to the second device. The operation proceeds from step 524 to one or both of steps 526 and 528 which may be performed in parallel or sequentially.

In step 526, the second device 104 transmits, on the second set of communications resources, the channel quality estimate to a peer communications device, e.g., first device 102, from which said signal of interest was received. The operation then proceeds from step 526 back to step 504. In such an embodiment, the device receiving the channel quality estimate may, and in sometimes does, select a transmission rate to be used to transmit data to the second device 104.

In embodiments where step 528 is implemented, the second device 104 selects a transmission rate to be used for data transmission by the peer communications device, e.g., first device 102, from which said signal of interest was received. For example, in some embodiments the transmission data rate may be selected by the second device 104 from a plurality of rates, based on the SIR determination in step 516. Operation proceeds from step 528 to step 530 wherein the second device 104 transmits to the first device 102, on the second set of communications resources, the selected rate, e.g., the suggested rate to be used for data transmission. Thus in accordance with an exemplary embodiment, once computed, the second device 104 may then transmit the transmission rate to the peer device from which the pilot signal was received. Operation proceeds from step 530 back to step 504.

Figure 6:
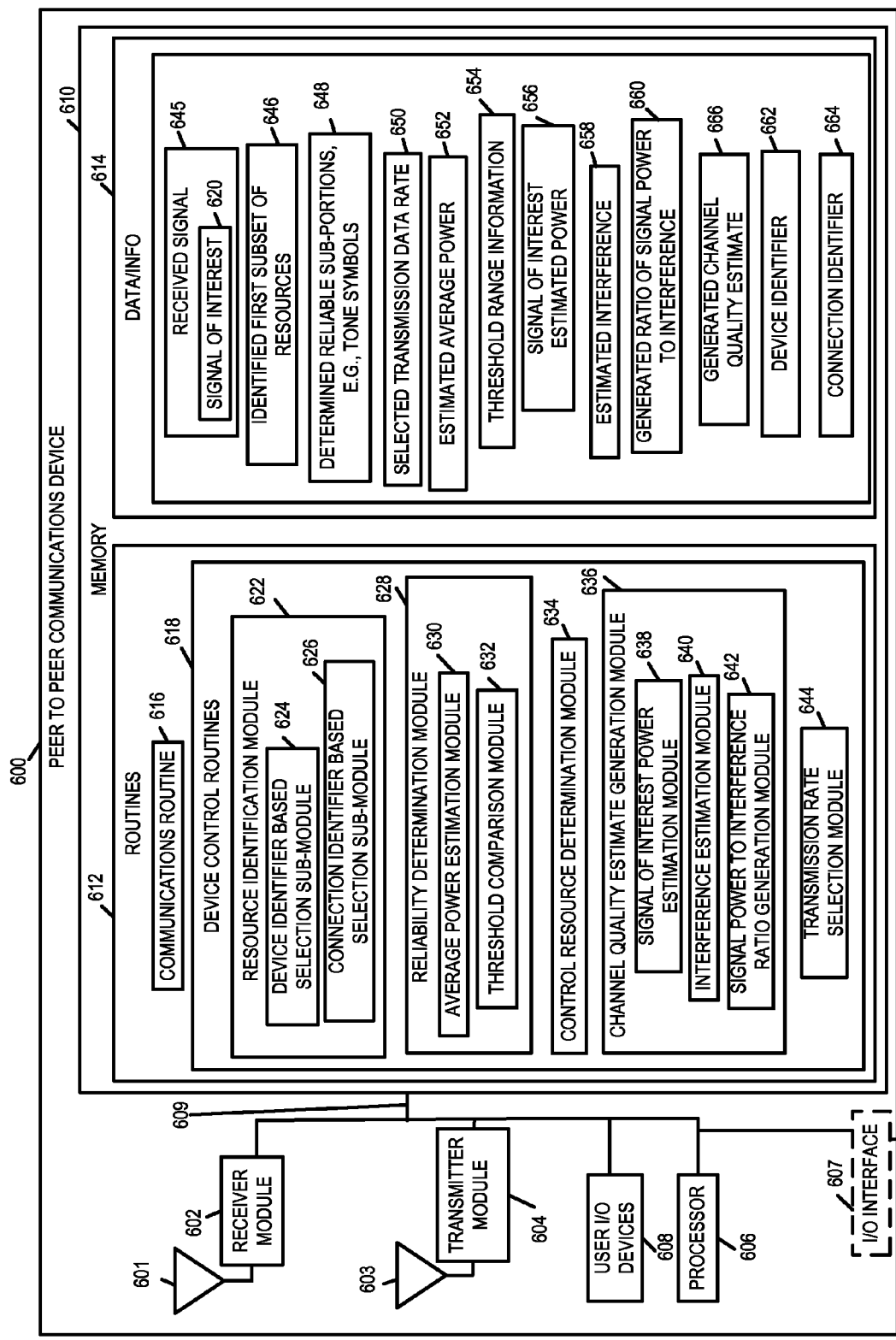
FIG. 6 is a drawing illustrating an exemplary peer to peer communications device, implemented in accordance with one exemplary embodiment.

FIG. 6 illustrates an exemplary peer to peer communications device 600, which can be used as the second device 104 of FIG. 1, in accordance with an exemplary embodiment. The device 600 may, and in some embodiments does, implement the method of FIG. 5.

Exemplary device 600 includes wireless receiver module 602, wireless transmitter module 604, a processor 606, user I/O devices 608, and memory 610 coupled together via a bus 609 over which the various elements may interchange data and information. In some embodiments the communications device 600 also includes an I/O interface 607 coupled to bus 609. The I/O interface 607 may be a wired interface, via which communications device 600 may be coupled to a backhaul network including other network nodes, a cellular network, and/or the Internet.

Memory 610 includes routines 612 and data/information 614. The processor 606, e.g., a CPU, executes the routines 612. Using the data/information 614 in memory 610, the processor 606 under the control of one or more routines, controls the communications device 600 to implement methods, e.g., a method in accordance with flowchart 500 of FIG. 5.

Routines 612 include a communications routine 616 and a set of device control routines 618. The communications routine 616 implements the various communications protocols and controls communications signaling used by the communications device 600. The device control routines 618 include a resource identification module 622, reliability determination module 628, a control resource determination module 634, a channel quality estimate generation module 636, and a transmission rate selection module 644. The resource identification module 622 includes a device identifier based selection sub-module 624 and a connection identifier based selection sub-module 626. The reliability determination module 628 includes an average power estimation module 630 and a threshold comparison module 632. The channel quality estimate generation module 636 includes a signal of interest power estimation module 638, an interference estimation module 640 and a signal power to interference ratio generation module (SIR generation module) 642.

Data/information 614 includes received signal 645, e.g., a signal received on larger set of communications resources 462, an identified first subset of resources 646, determined reliable sub-portions of the first subset 648, selected transmission data rate 650, an estimated average power 652, threshold range information 654, signal of interest estimated power 656, estimated interference 658, generated ratio of signal power to interference 660, a device identifier 662, a connection identifier 664 and generated channel quality estimate 666.

Wireless receiver module 602 which may be, e.g., an OFDM receiver, is coupled to receive antenna 601 via which the communications device 600 receives signals from other peer communications devices. The wireless receiver module 602 is configured to receive a signal on the larger set of communications resources, e.g., received signal 645. Signals received by the receiver module include, e.g., peer discovery signals, received signals 645 and/or other signals transmitted by other peer communications devices, e.g., first device 102, seeking to establish communications with the second device 104.

Wireless transmitter module 604 may be, e.g., an OFDM transmitter. The transmitter 604 is coupled to transmit antenna 603 via which the communications device 600 transmits signals to other devices. In some embodiments, the same antenna is used for the receiver and the transmitter rather than separate antennas 601, 603. During the operation, the wireless transmitter module 604 may, and sometimes is, configured to transmit on a second set of communications resources, a generated channel quality estimate 666 to a peer communications device from which a signal of interest was received, e.g., first device 102. The second set of communications resources may be, e.g., a set of tone-symbols corresponding to a different frequency band than a frequency band used to receive pilot signals. The wireless transmitter module 604 is further configured, at various points in time, to transmit to the peer communications device from which the signal of interest was received, on the second set of communications resources, the rate to be used for data transmission 650. It should be appreciated that the same transmitter module transmits traffic data, at various points in time during the operation. The traffic data may include user data, e.g., peer to peer traffic data conveying text, audio, and/or image data.

Resource identification module 622 is for identifying a first subset of communications resources out of a larger set of communications resources. For example the first subset may be, e.g., a first subset of tone-symbols 464, and the larger set of communications resources may be, e.g., larger set 462, as shown in FIG. 4. In some embodiments, the resource identification module 622 includes a device identifier based selection sub-module 624 configured to select, as said first subset, resources corresponding to a device identifier of said communications device 600 or a device identifier corresponding to the device transmitting the signal of interest. In some embodiments the resource identification module 622 also, or alternatively includes a connection identifier based selection sub-module 626 configured to select, as said first subset, resources corresponding to a connection identifier corresponding to a connection used the communications device 600. It should be appreciated that a connection identifier may correspond to, e.g., a connection between the pair of communicating peer devices including the device making the selection. For example, the connection identifier may correspond to both, the communications device 600 and other peer device, e.g., first device 102, which may be communicating with the communications device 600.

Reliability determination module 628 is for determining, based on the received energy corresponding to individual sub-portions of the received signal 645, if one or more sub-portions of the received signal 645 corresponding to the first subset of communications resources are reliable. In some embodiments, the portion of the received signal may be a signal of interest 620, e.g., a pilot signal and/or other signal, communicated from other peer communications device, e.g., first device 102. In some embodiments, the signal of interest may, and sometimes is, received on the identified first subset of communications resources. In some embodiments, the sub-portions corresponding to a portion of said signal corresponding to the first subset of communications resources are, e.g., the signal portions received on individual tone-symbols included in the first subset of communications resources 464. In some embodiments the reliability determination module 628 includes an average power estimation module 630 and a threshold comparison module 632. The average power estimation module 630 estimates the average power per signal sub-portion corresponding to the portion of the received signal corresponding to the first subset of communications resources. The module 630 may produce the average power by considering signal power on each individual tone-symbol corresponding to the first subset of communications resources and creating an average therefrom. The threshold comparison module 632 determines which sub-portions have a sub-portion signal power within a threshold range of said average power. The threshold range may be a predetermined value or may be a dynamically generated value, a range generated by the communications device 600 depending on, e.g., the range of the power levels of signal sub-portions corresponding to the first subset of resources. Using the result produced by threshold comparison module 632, the sub-portions determined to have a sub-portion signal power within a threshold range of said average power may, and sometimes are, identified as being reliable. The output of the reliability determination module 628 is stored as determined reliable sub-portions 648. Thus information 648 indicates signal sub-portions corresponding to the signal of interest which were not subject to excessive interference, e.g., interference due to a collision with a nearby device.

Channel quality estimate generation module 636 is configured to generate a channel quality estimate based on the sub-portions corresponding to the first subset of resources which have been determined to be reliable and a second portion of said signal corresponding to communication resources in said larger set of communications resources 462, which are not included in said first subset 464. For example, the module 636 may generate a channel quality estimate by using the reliable sub-portions to provide a signal of interest power level with the second portion providing an interference (noise) power level. The channel quality estimate generation module 636 includes a signal of interest power estimation module 638 which generates a power estimate of the signal of interest based on the sub-portions determined to be reliable. The channel quality estimate generation module 636 further includes an interference estimation module 640 and a signal power to interference ratio generation module 642. The interference estimation module 640 generates a power estimate of interference based on received energy of the second portion of the signal, i.e., the portion of the signal which corresponds to, e.g., tone-symbols which were not used to communicate a signal of interest. The signal power to interference ratio generation module 642 generates a ratio of the power estimate of the signal of interest (e.g., generated by module 638) and the power estimate of interference (e.g., generated by module 640).

Control resource determination module 634 is for selecting a second set of communications resources, e.g., tone-symbols, to be used for communicating, e.g., by transmitting, control signals. The control signals include, e.g., a rate feedback signal/signal indicating transmission data rate and/or other signals used for communicating control information.

Transmission rate selection module 644 is for selecting a transmission rate to be used for data transmission by a peer communications device from which a signal of interest was received, e.g., the first device 102. The communication device 600 uses module 644 to determine a preferred transmission rate that can be used by the peer communications device from which the signal of interest was received. Once selected, the selected transmission rate may, and sometime is, transmitted to the peer communications device, e.g., first device 102, via the transmitter module 604.

Received signals 645 represent signal received by the communications device 600 via the wireless receiver module 602, e.g., signal received on the larger set of communications resources 462. The signals may be stored as a plurality of digital sample values. The received signal 645 includes a signal of interest 620. In some embodiments, the signal of interest may be, e.g., a pilot signal, communicated from a peer communications device such as first device 102. In some other embodiments, the signal of interest may be, e.g., a rate feedback signal. Identified first subset of resources 646 includes information as to which communication resources out of the larger set 462 have been identified to belong to the first subset of resources, e.g., first subset 464. The identified first subset of resources 646 is an output of the resource identification module 622.

Determined reliable sub-portions 648 includes information as to which signal sub-portions, e.g., signal portions corresponding to tone-symbols, of the first subset of communications resources 464 are determined to be reliable. As discussed above, using the average power estimation module 630 and threshold comparison module 632, the communications device 600 determines the reliable sub-portions of the signal of interest by identifying signal sub-portions with excessive energy. Thus, the information indicating determined reliable sub-portions 648 is an output of the reliability determination module which includes both modules 630 and 632.

Selected transmission data rate 650 is the selected transmission data rate which can be used by the first device 102 from which the signal of interest 620 is received. This data rate may be selected based on the detected channel quality as indicated by the generated SIR values. In some embodiments, the communications device 600 may, and sometime does, transmit the selected transmission data rate 650 in a signal to the first device 102, e.g., using a selected set of resources. Estimated average power 652 is the generated estimate of the average power per signal sub-portion corresponding to the portion of the received signal corresponding to the first subset of communications resources. The estimated average power 652 is an output of the average power estimation module 630 and may be taken as an input to the threshold comparison module 632.

Threshold range information 654 includes information regarding the threshold ranges that can be used by the threshold comparison module 632. Thus the threshold range information 654 acts as an input to the threshold comparison module 632. The range may be predetermined. The signal of interest estimated power 656 is an output of the signal of interest power estimation module 638, and includes the estimated average per sub-portion value of the power of the signal of interest, based on the sub-portions determined to be reliable. The estimated power 656 is also a first input to the signal power to interference ratio (SIR) generation module 642. Estimated interference 658 is an estimated interference value produced by the interference estimation module 640. The estimated interference 658 value is used as a second input to the signal power to interference ratio generation module 642.

Generated ratio of signal power to interference 660 is the ratio generated by the signal power to interference ratio generation module 642. Generated channel quality estimate 666 is the output of the channel quality estimate generation module 636 e.g., as discussed in regard to the method of flowchart 500.

The device identifier 662 may be, e.g., an identifier of the communications device 600/second device 104. The device identifier 662 is used, in some embodiments, by the resource identification module 622 when identifying the first subset of resources that correspond to the device identifier. The connection identifier 664 is used in other embodiments by the resource identification module 622 when identifying the first subset of resources that correspond to the connection identifier. For example, the connection identifier may be used, e.g., as an input to a function known to the various peer devices in the system for selecting set of tone-symbols. As discussed earlier, the connection identifier 664 may correspond to, e.g., a pair of communicating peer devices, e.g., the first and second devices 102, 104.

Figure 7A:
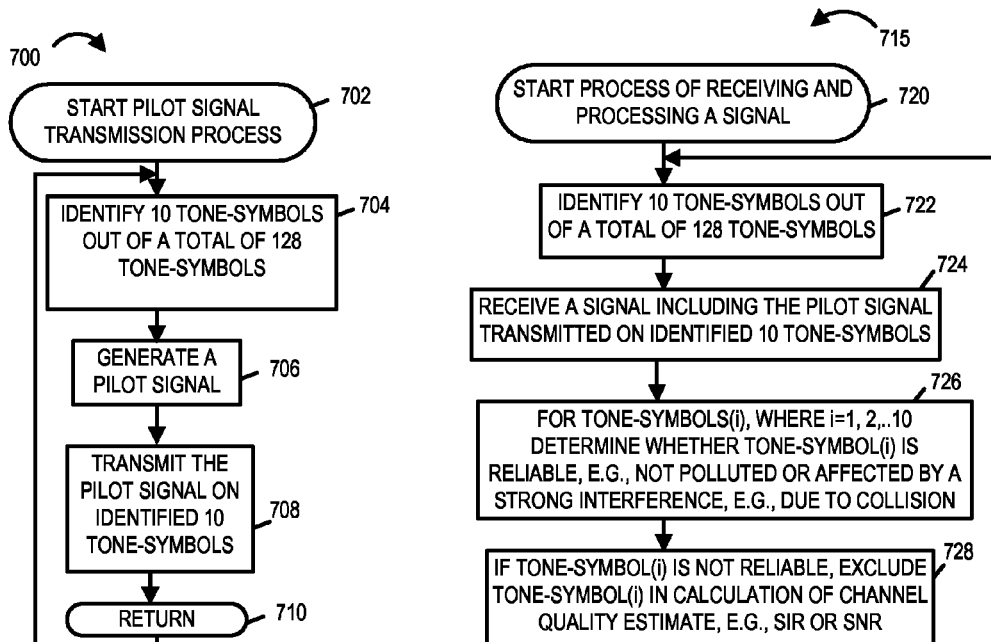
FIG. 7A is a flowchart illustrating an exemplary process of generating and/or transmitting a pilot signal, in accordance with an exemplary embodiment.

FIG. 7A is a flowchart 700 illustrating an exemplary process of generating and/or transmitting a pilot signal, in accordance with an exemplary embodiment. The exemplary process shown in flowchart 700 may be implemented by a peer to peer communications device, e.g., first device 102, which may transmit pilot signals to another peer communications device during operation. The exemplary process starts in step 702 where the communications device, e.g., first device 102, is powered on and initialized. Operation proceeds from start step 702 to step 704.

In step 704, the first device 102 identifies first subset of tone-symbols, e.g., 10 tone-symbols out of a total number of available tone-symbols, e.g., a total of 128 tone-symbols. In this example, the identified first subset of 10 tone-symbols are used by the first device 102 to communicate a pilot signal to another peer communications device, e.g., second device 104. The operation proceeds from step 704 to step 706 wherein the first device 102 generates a pilot signal, e.g., a signal having a predetermined power level and phase, with a phase of zero being preferred in some embodiments. The operation proceeds from step 706 to step 708.

In step 708, the generated pilot signal is transmitted by the first device 102, on the identified set of 10 tone-symbols which were selected in step 704. The operation proceeds to return step 710 from where the operation proceeds back to step 704. The exemplary process in flowchart 700 may, and sometimes is repeated, e.g., periodically and/or on a non-periodic basis.

Figure 7B:
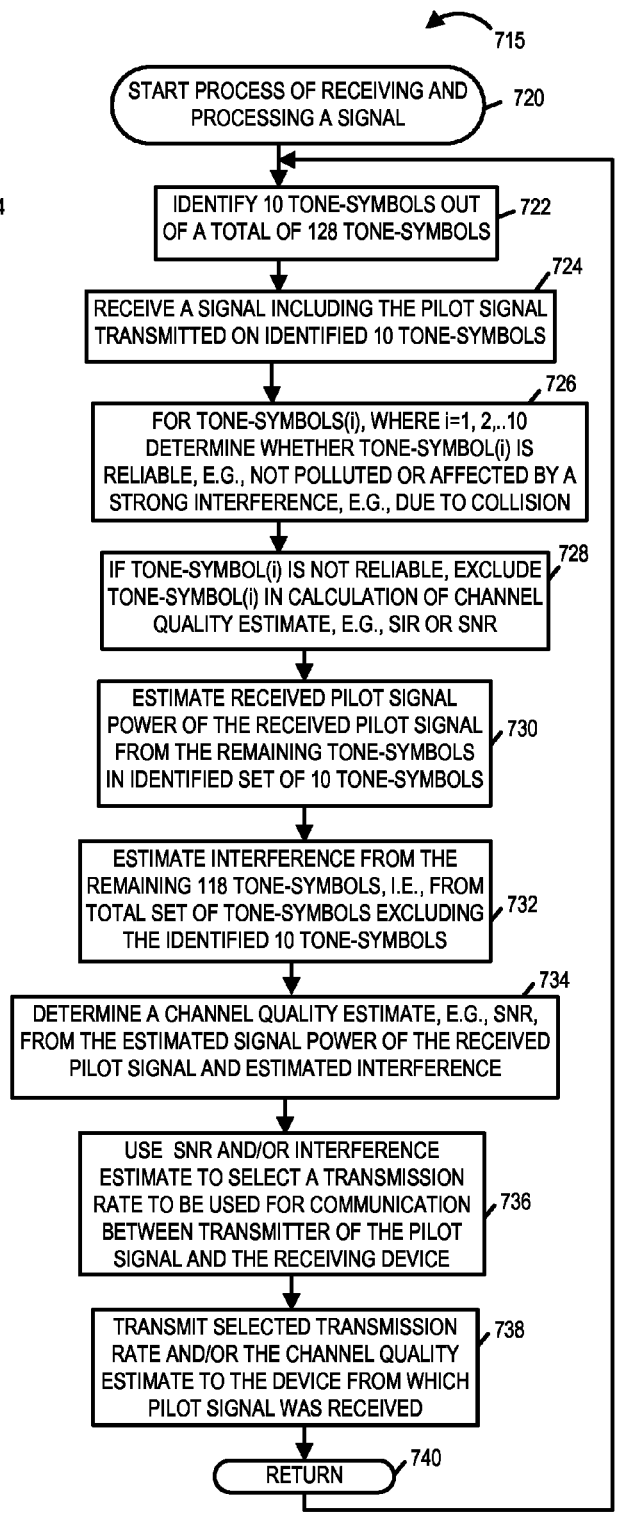
FIG. 7B is a flowchart illustrating an exemplary process of receiving and processing a signal, e.g., a signal including a pilot signal such as the one transmitted in accordance with the method of FIG. 7A.

FIG. 7B is a flowchart 715 illustrating an exemplary process of receiving and processing a signal, e.g., a signal including a pilot signal such as the one transmitted in accordance with the method of FIG. 7A. The exemplary process shown in flowchart 715 may be implemented by a peer to peer communications device, e.g., second device 104, which may receive pilot signals from other peer communications devices during operation. The exemplary process starts in step 720 where the communications device, e.g., second device 104, is powered on and initialized. Operation proceeds from start step 720 to step 722.

In step 722, the second device 104 identifies a subset of tone-symbols, e.g., 10 tone-symbols out of a total number of available tone-symbols, e.g., total of 128 tone-symbols where the identified set is a subset on which a pilot signal was transmitted. In this example, the pilot signal transmitted from the first device 102 is received by the second device 104 as discussed below, on the identified 10 tone-symbols. It should be appreciated that the same set of 10 tone-symbols is identified by the second device 104 for receiving the pilot signal that was identified by the first device 102 for transmitting the pilot signal. The identification of tone-symbols may be based on a device or connection based identifier and function known to both the device sending the pilot signal and the device receiving the signal. The function is designed to reduce the probability that pair of devices will select substantially overlapping tone sets for pilot signal transmission. The operation proceeds from step 722 to step 724.

In step 724 the second device 104 receives the pilot signal transmitted by the first device 102, with energy on the identified 10 tone-symbols. The operation proceeds from step 724 to step 726 wherein a determination is made whether or not one or more of the identified tone-symbols on which the pilot signal is received, are reliable. For example, a determination is made if one or more of the tone-symbols in the identified set of 10 tone-symbols, is affected by strong interference and/or noise which can occur in the case of a collision. This can be done in several ways, for example, by calculating an average power per tone-symbol and then comparing the signal power received on each individual tone-symbol in the identified set of 10 tone-symbols to the calculated average power. If the signal power received on a tone-symbol is above/below a threshold level then that tone-symbol may be regarded as unreliable. For example, if a tone symbol has more than 1.5 times the average per tone symbol power of the 10 tone-symbols, it may be considered unreliable. Operation proceeds from step 726 to step 728.

In step 728 tone-symbols which are determined to be unreliable are excluded from consideration in calculating the channel quality estimate, e.g., SNR. The operation proceeds from step 728 to step 730 wherein the second device 104 estimates the signal power of the received pilot signal, from the remaining tone-symbols in the identified set of 10 tone-symbols. The remaining tone-symbols are, e.g., the reliable tone-symbols, in the identified set of 10 tone-symbols. Operation proceeds from step 730 to step 732. In step 732 an interference estimate is generated by the second device 104 from the tone-symbols which are not included in the identified set of 10 tone-symbols, e.g., the remaining 118 tone-symbols out of total of 128 tone-symbols of the received signal are considered in generating the interference estimate. Operation proceeds from step 732 to step 734.

In step 734 the second device 104 determines the channel quality estimate, e.g., an SIR or SNR, from the estimated signal power of the received pilot signal (e.g., as estimated in step 730) and the estimated interference (e.g., as estimated in step 732). The SIR may be determined in a variety of ways, e.g., as a sum of the energy on the tone-symbols in the set of 10 selected tone-symbols divided by the sum of the energy detected on the 118 tone-symbols not used for pilot signal transmission. The operation proceeds from step 734 to step 736 wherein a transmission rate is selected using the calculated SIR or SNR and/or the interference estimate. The selected transmission rate may be used for communication of traffic data between the transmitter of the pilot signal, e.g., first device 102, and the receiving device, e.g., second device 104. Operation proceeds from step 736 to step 738.

In step 738 the selected transmission rate and/or the determined channel quality estimate (SIR or SNR), is transmitted by the second device 104 to the device from which the pilot signal was received, e.g., first device 102. The operation proceeds to return step 740 from where the operation proceeds back to step 722. The exemplary process in flowchart 715 may, and sometimes is, periodically and/or non-periodically repeated.

Figure 8:
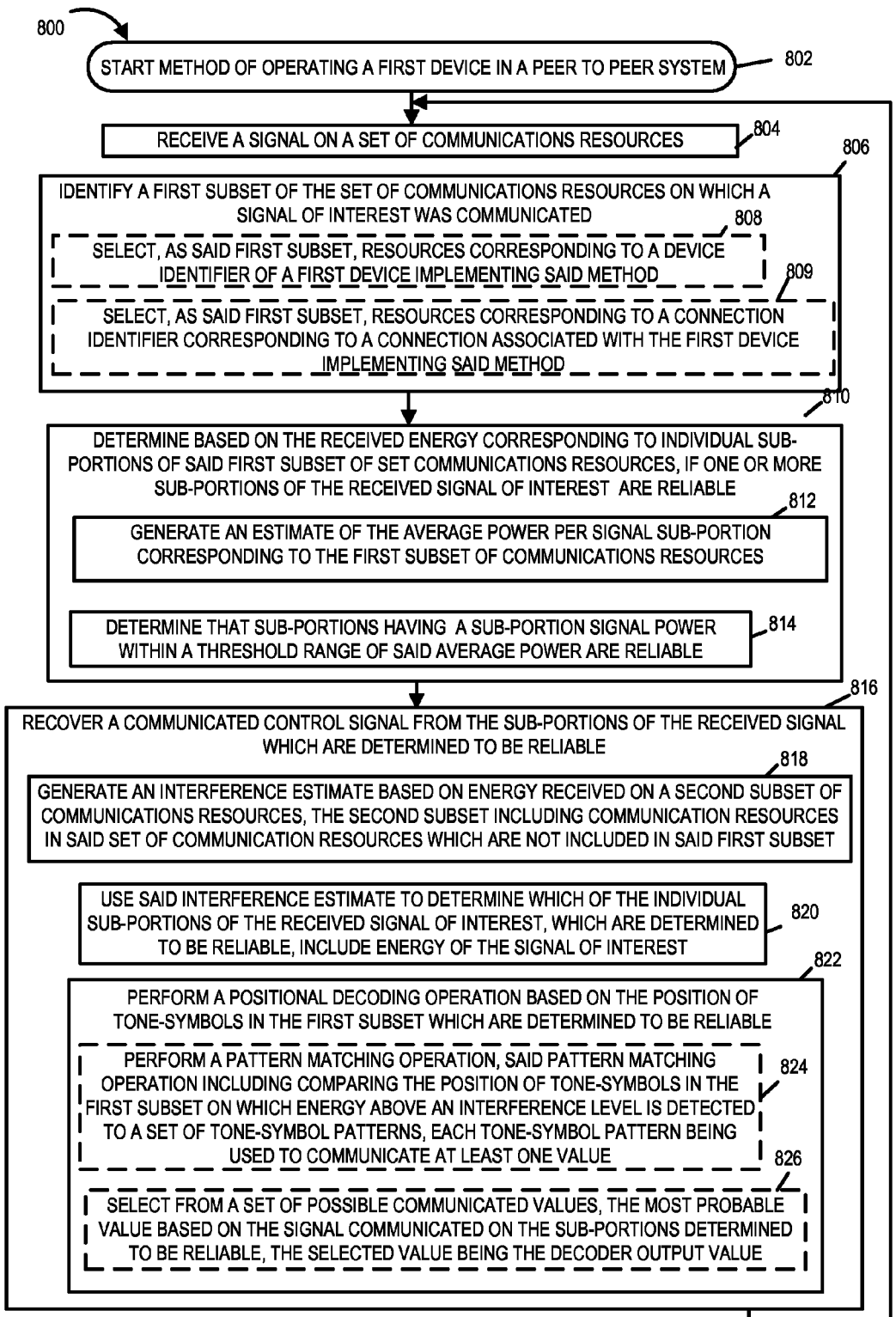
FIG. 8 is a flowchart of an exemplary communications method of operating a communication device in accordance with an exemplary embodiment.

FIG. 8 is flowchart 800 of another exemplary communications method of operating a communications device, e.g., first device 102, in a peer to peer communications system. In an exemplary embodiment, control signal and/or a ACK/NAK information, is communicated by a peer communications device, e.g., second device 104, and recovered by the first device 102 implementing the method of flowchart 800. In some embodiments, the control information is, e.g., a rate feedback signal, which may be transmitted by, e.g., the second device 104. In some other embodiments, the method may be implemented to recover ACK/NAK information. It should be appreciated that the control signal, e.g., the rate feedback signal, may be transmitted from the second device 104, in response to a pilot signal sent by the first device 102, at some earlier point in time, e.g., as discussed with regard to FIGS. 7A and 7B. In some but not all embodiments, communications resources are individual tone-symbols, e.g., tone-symbols 260. Operation of the exemplary method starts in step 802 where the communications device, e.g., first device 102, is powered on and initialized. Operation proceeds from start step 802 to step 804.

In step 804 the communications device 102 receives a signal including a signal of interest on a set of communications resources, e.g., tone-symbols. The received signal may be received, e.g., on a large set of communications resources 462. The received signal may include, e.g., the signal of interest received on a subset of communications resources, with interference, e.g., noise, being received on other communication resources and possibly one or more of the communications resources used to communicate the signal of interest. As discussed earlier, the received signal may have one or more portions. Thus a portion of the received signal may be the signal of interest, e.g., a control signal and/or other signal, communicated from another peer communications device, e.g., second device 104. Operation proceeds from step 804 to step 806.

In step 806, the first device identifies a first subset of communications resources, e.g., first subset 464, out of the larger set of communications resources, e.g., larger set 462 on which the signal is received. The first subset of resources are resources used to communicate the signal of interest. In some embodiments, the step 806 includes sub-steps 808 and 809. In embodiments where a device identifier is used to determine the subset of resources used to communicate the signal of interest, sub-step 808 is performed. In other embodiments where a connection identifier is used to determine the subset of resources used to communicate the signal of interest, sub-step 809 is performed. In sub-step 808, the first device 102 selects, as the first subset, resources corresponding to a device identifier. The device identifier may be, e.g., an identifier associated with the first device 102 or the second device 104. In sub-step 809, the first device 102 selects, as the first subset, resources corresponding to a connection identifier corresponding to a communications connection in which the first device 102 participates. In some embodiments, positional coding is used to communicate information. In at least one embodiment the communicated control signal uses the position of tone-symbols in the first subset on which energy is transmitted, to communicate a value, e.g., in the form of a codeword. In accordance with an exemplary embodiment, the identified first subset may include, e.g., 20 tone-symbols. To communicate the signal of interest to the first device 102, the second device 104 may put energy on, e.g., 10 tone-symbols out the 20 tone-symbols in the first subset with the pattern of tone-symbols in the set of 20 tone-symbols having energy communicating information, e.g., a codeword or other value. Thus positional coding is used in some embodiments. Thus the position of the tone-symbols on which signal energy has been placed and/or the absence of energy corresponding to the signal of interest, within the identified subset of tone-symbols used to convey the signal of interest, indicates what value has been communicated in the signal of interest. By decoding, e.g., using positional decoding techniques, the first device 102 may recover the control information included in the signal of interest as will be discussed further in the sections that follow.

Operation proceeds from step 806 to step 810. In step 810, the first device 102 determines, based on the received energy corresponding to individual sub-portions of the first subset of the set of communications resources, if one or more sub-portions of the received signal of interest are reliable. It should be appreciated that signal sub-portions of the first subset of communications resources in an OFDM embodiment are signal portions received on individual tone-symbols of the first subset. In non OFDM embodiments the signal sub-portions may be portions of a signal corresponding to a code or time period. Thus in step 810, a determination is made if one or more sub-portions, e.g., tone-symbols, corresponding to the first subset of resources, is contaminated due to interference, e.g., resulting from noise and/or a collision. The tone-symbols which are affected by significant interference, e.g., interference beyond some threshold level are regarded as unreliable. The signal portions corresponding to the first subset which are not found to be unreliable are determined to be reliable. In some embodiments, step 810 includes sub-steps 812 and 814.

In sub-step 812, the device implementing the method, e.g., first device 102 generates an estimate of the average power per signal sub-portion corresponding to the first subset of communications resources. For example, the first device 102 generates an estimate of the average power received on sub-portions, e.g., the tone-symbols, corresponding to the first subset 464. In sub-step 814, the first device 102 determines the sub-portions, e.g., tone-symbols, having sub-portion signal power within a threshold range of the average power (average power per signal sub-portion generated in sub-step 812), and identifies such tone-symbols and the signal portions communicated thereon as being reliable. Tone-symbols with energy outside the threshold range of the average power are considered unreliable. For example, in some embodiments the first device 102 may compare the signal power on tone-symbols corresponding to the first subset 464 with the generated average power level. Thus, the sub-portions, e.g., tone-symbols having signal power within, e.g., a predetermined range of the average per tone-symbol signal power, may be determined to be reliable. The other tone-symbols which are outside the threshold range, may be regarded as unreliable. The threshold range may be predetermined, e.g., based on knowledge of the number of tone-symbols in the subset which are to include signal power based on the coding being used, e.g., 10 tone-symbols out of 20 may be expected to have power based on a coding scheme where 10 tone-symbols are on and 10 are off out of every 20 tone-symbols transmitted to communicate a codeword. The discrepancy in power level on unreliable tone-symbols may be due to, e.g., collision on the tone-symbols found to be unreliable. In accordance with various exemplary embodiments, the tone-symbols which are regarded as unreliable are not used in the recovery process of the control information included in the signal of interest. The operation proceeds from step 810 which includes sub-steps 812 and 814, to step 816.

In step 816, the first device 102 recovers, from the sub-portions of the received signal of interest which are determined to be reliable, a communicated control signal. In some embodiments, during the recovery step 816, one or more of sub-steps 818, 820, and 822 may be performed. In sub-step 818, an interference estimate based on energy received on a second subset of communications resources, is generated. The second subset of the set of communications resources includes communications resources in the set of communications resources which are not included in the first subset, e.g., tone-symbols of a recovered OFDM symbol which are not used to communicate the signal of interest to be recovered. The second subset of resources may be, e.g., resources 466 shown in FIG. 4. The energy received on second subset of resources, e.g. tone-symbols, may be, e.g., interference, e.g., noise. The generated interference estimate may be, e.g., an estimate of the average per tone-symbol energy detected on tone-symbols 466. This value may be considered an estimate of the per tone-symbol noise which can be expected on the tone-symbols of the first subset on which the signal to be recovered was communicated. In sub-step 820 the first device 102 uses the generated interference estimate to determine which of the individual sub-portions of the received signal of interest, which are determined to be reliable, include energy of the signal of interest. For example, in step 820, the first device 102 may determine which reliable tone-symbols in the first subset carry energy corresponding to the signal of interest and therefore may be considered as communicating, e.g., a binary 1 at a tone-symbol position. Reliable tone-symbols that carry energy of the signal of interest may be determined by identifying reliable tone-symbols on which energy exceeding the estimated per tone-symbol noise level, e.g., by a predetermined amount is detected. Thus based on the position of signal energy in the first subset, and absence of energy on tone-symbols, the device 102 may be able to decode the communicated value, e.g., using positional decoding.

In sub-step 822, the first device 102 performs a positional decoding operation based on the position of tone-symbols in said first subset which are determined to be reliable. In some embodiments, sub-step 822 further includes optional sub-steps 824 and 826. In some embodiments, performing positional decoding includes performing sub-step 824. In the embodiments where positional decoding involves sub-step 824, the first device performs a pattern matching operation which includes comparing the position of tone-symbols in the first subset on which energy above an interference level is detected, to a set of tone-symbol patterns, each tone symbol pattern being used to communicate at least one value. If a match is found, the value corresponding to the matching pattern is determined to be the received value and serves as the decoded output. In those embodiments, where sub-step 826 is performed, the device 102 selects from a set of possible communicated values, the most probable value based on the signal communicated on the sub-portions determined to be reliable, i.e., reliable tone-symbols. In sub-step 826 probability techniques may be used to identify the best match with an exact match not being required. In such a case, the best match indicates the value to be output as the recovered communicated value. The operation then proceeds from step 826 back to step 804 where the process is repeated as signals corresponding to additional codewords are received and processed.

Figure 9:
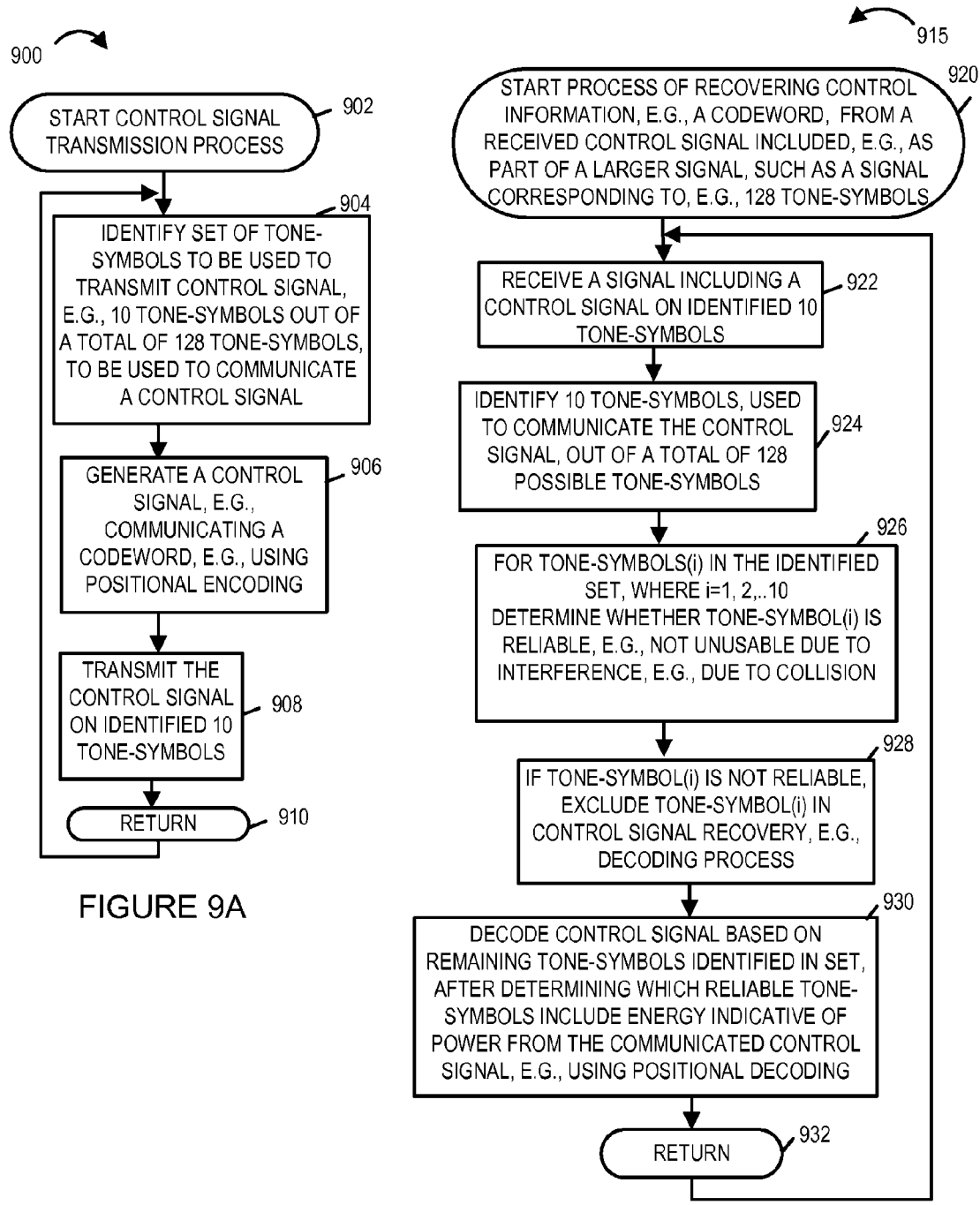
FIG. 9A is a flowchart illustrating an exemplary process of transmission of a control signal, e.g., communicating a codeword, in accordance with an exemplary embodiment.
FIG. 9B is a flowchart illustrating an exemplary process of recovering control information, e.g., a codeword such as the type which may be communicated in accordance with the method of FIG. 9A, from a received signal, in accordance with an exemplary embodiment.

FIG. 9A is a flowchart 900 illustrating an exemplary process of generating and transmitting a control signal, in accordance with an exemplary embodiment. The exemplary process shown in flowchart 900 may be implemented by a peer to peer communications device, e.g., second device 104, which may transmit control signals to other peer communications devices during operation. The exemplary control signal transmission process starts in step 902. Operation proceeds from start step 902 to step 904.

In step 904, the second device 104 identifies 10 tone-symbols out of a total number of available tone-symbols, e.g., a total of 128 tone-symbols. This may be done according to a predetermined function known to one or more other peer devices. In this example, the identified 10 tone-symbols are used by the second device 104 to communicate a control signal to another peer communications device, e.g., first device 102. The identification may be based on a device identifier corresponding to device 102 or 104 or based on a communications link identifier corresponding to devices 102, 104 with the utilized identifier serving as input to the function which determines the tone-symbols to be used for communicating the control signal. The operation proceeds from step 904 to step 906 wherein the second device 104 generates the control signal, e.g., communicating a codeword, e.g., using position encoding to encode the value to be communicated. Thus the position of tone-symbols in the set of 10 tone-symbols on which energy is transmitted alone or in combination with the position of null tones on which energy is not transmitted, can be used to communicate a control value in the form of a signal. The operation proceeds from step 906 to step 908.

In step 908, the generated control signal is transmitted on the identified set of 10 tone-symbols, to the other peer communications device. The operation proceeds to return step 910 from where the operation proceeds back to step 904 where the process can be repeated as required to communicate additional control information, e.g., values in the form of a codeword. The exemplary process in flowchart 900 may, and sometimes is, periodically and/or non-periodically repeated.

FIG. 9B is a flowchart 915 illustrating an exemplary process of recovering control information, e.g., a codeword such as the type which may be communicated in accordance with the method of FIG. 9A, from a received signal, in accordance with an exemplary embodiment. The exemplary process shown in flowchart 915 may be implemented by a peer to peer communications device, e.g., first device 102, which may receive control signals, e.g., signals generated and transmitted in the manner shown in FIG. 9A, from other peer communications devices during operation. The exemplary process of recovering control information from the received control signal starts in step 920. Operation proceeds from start step 920 to step 922.

In step 922, the first device 102 receives the control signal transmitted by a peer communications device, e.g., second device 104, on, e.g., a set of 10 tone-symbols selected by the second device in a manner known to first device. The operation proceeds from step 922 to step 924.

In step 924, the first device 102 identifies the set of tone-symbols, e.g., 10 tone-symbols used to communicate the control signal, out of a total of 128 possible tone-symbols. Step 924 may be implemented in the same manner as step 904 with the sending and receiving devices using the same function and identifier value to determine the set of tone-symbols used to communicate the control signal. The operation proceeds from step 924 to step 926 wherein a determination is made whether or not one or more of the identified tone-symbols on which the control signal is received, are reliable. For example, a determination is made if one or more of the tone-symbols in the identified set of 10 tone-symbols, is affected by strong interference, e.g., noise. This can be done in several ways as has been discussed earlier, e.g., based on the energy measured on the tone-symbol being compared to a range or threshold determined based on the energy of other tone-symbols in the set of 10 identified tone-symbols. Thus, in step 926 reliable tone-symbols are detected from the set of identified set of 10 tone-symbols and tone-symbols not determined to be reliable are considered unreliable. Operation proceeds from step 926 to step 928.

In step 928 one or more of the tone-symbols which are not determined to be reliable, e.g., are found to be unreliable, are excluded from consideration in the control signal recovery process, e.g., decoding process. The operation proceeds from step 928 to step 930 wherein the first device 102 decodes the control signal based on remaining tones on which signal energy is detected, to recover communicated codeword. The decoding process may be, e.g., a positional decoding. Signals from tone-symbols which are found to be unreliable are thus treated as communicating unrecoverable signal portions and, in some embodiments, excluded from use in the positional decoding operation. It should be noted that the remaining tone-symbols referred to in step 930 include, e.g., the reliable tone-symbols from the set of identified set of 10 tone-symbols as well as 118 remaining tone-symbols from the total 128 tone-symbols may be used in the decoding process. Note that in some embodiments the energy on the 118 tone-symbols of a received OFDM symbol including 128 tone-symbols, 10 of which communicate the control signal, may, and sometimes is, used to determine a noise level used to determine which of the reliable 10 tone-symbols have signal energy corresponding to the control signal as opposed to simply noise which should be interpreted for decoding purposes as a null tone-symbol. The operation proceeds to return step 932 from where the operation proceeds back to step 922. The exemplary process in flowchart 915 may, and sometimes is, periodically and/or non-periodically repeated.

Figure 10:
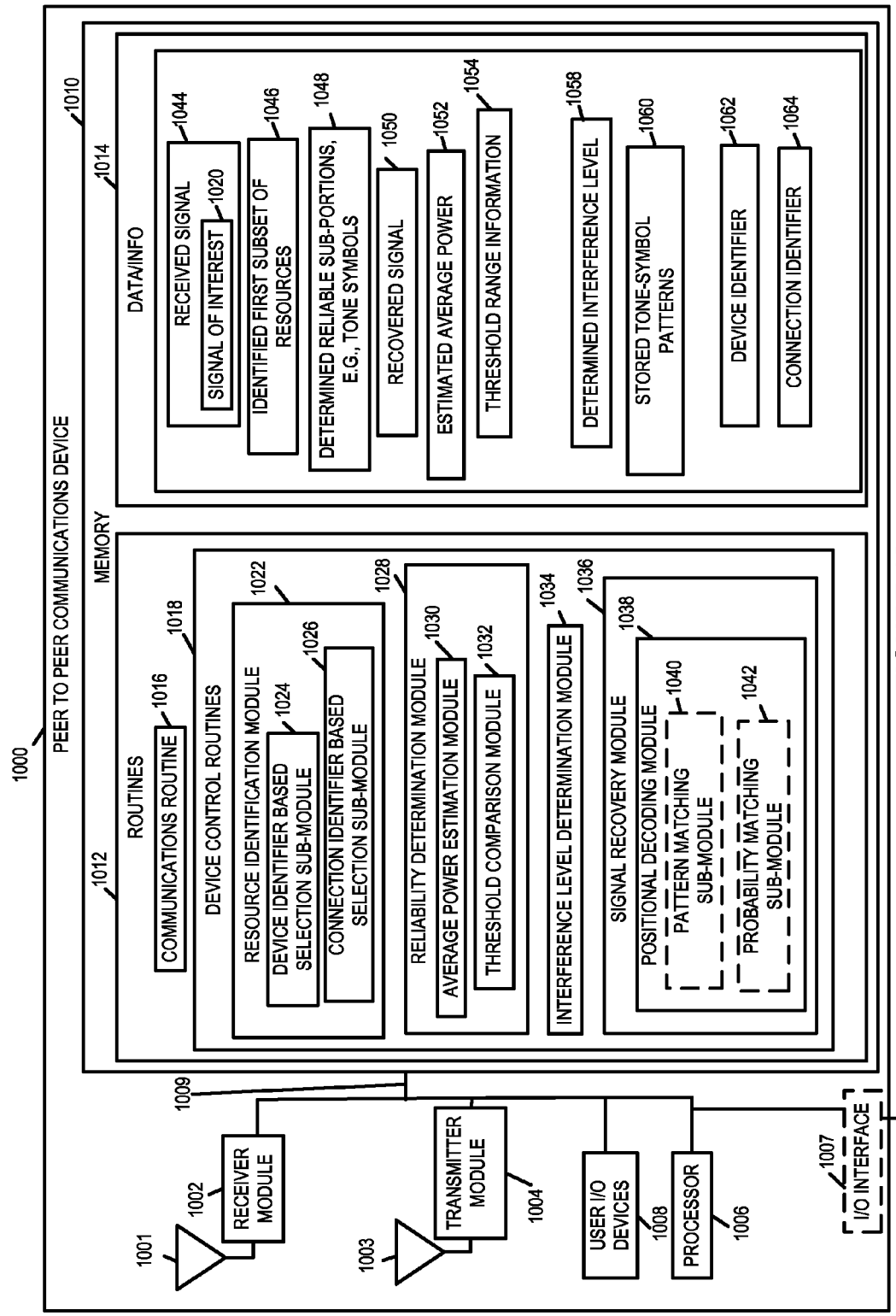
FIG. 10 is a drawing illustrating an exemplary peer to peer communications device, implemented in accordance with one exemplary embodiment.

FIG. 10 is a drawing of an exemplary peer to peer communications device 1000, which may be implemented as the first device 102 of FIG. 1, in accordance with an exemplary embodiment.

Exemplary device 1000 includes wireless receiver module 1002, wireless transmitter module 1004, a processor 1006, user I/O devices 1008, and memory 1010 coupled together via a bus 1009 over which the various elements may interchange data and information. In some embodiments the communications device 1000 also includes an I/O interface 1007 coupled to bus 1009. The I/O interface 1007 may be a wired interface, via which communications device 1000 may be coupled to a backhaul network including other network nodes, a cellular network, and/or the Internet.

Memory 1010 includes routines 1012 and data/information 1014. The processor 1006, e.g., a CPU, executes the routines 1012. Using the data/information 1014 in memory 1010, the processor 1006 under the control of one or more routines, controls the communications device 1000 to implement methods, e.g., a method in accordance with flowchart 800 of FIG. 8.

Routines 1012 include a communications routine 1016 and a set of device control routines 1018. The communications routine 1016 implements the various communications protocols used by the communications device 1000. The device control routines 1018 include a resource identification module 1022, reliability determination module 1028, an interference level determination module 1034, and a signal recovery module 1036. The resource identification module 1022 includes a device identifier based selection sub-module 1024 and a connection identifier based selection sub-module 1026. The reliability determination module 1028 includes an average power estimation module 1030 and a threshold comparison module 1032. The signal recovery module 1036 includes a positional decoding module 1038. In some embodiments, the positional decoding module 1038 includes a pattern matching sub-module 1040. In some embodiments the positional decoding module 1038 includes a probability matching sub-module 1042.

Data/information 1014 includes received signal 1044, e.g., a signal received on larger set of communications resources 462, an identified first subset of resources 1046, information indicating determined reliable sub-portions of the first subset 1048, recovered communicated signal 1050, e.g., in the form of a recovered value, an estimated average per tone-symbol power level 1052, threshold range information 1054, determined interference level 1058, a device identifier 1062, and a connection identifier 1064.

Wireless receiver module 1002 which may be, e.g., an OFDM receiver, is coupled to receive antenna 1001 via which the communications device 1000 receives signals from other peer communications devices. The wireless receiver module 1002 is configured to receive a signal on the larger set of communications resources, e.g., received signal 1044. Signals received by the receiver module 1002 include, e.g., peer discovery signals, received signal 1044 and/or other signals transmitted by other peer communications devices, e.g., second device 104.

Wireless transmitter module 1004 may be, e.g., an OFDM transmitter which transmits signals in the form of OFDM symbols using multiple tone-symbols per OFDM symbol. The transmitter 1004 is coupled to transmit antenna 1003 via which the communications device 1000 transmits signals to other devices. In some embodiments, the same antenna is used for the receiver and the transmitter rather than separate antennas 1001, 1003. At various points in time during the operation, the wireless transmitter module 1004 may, and sometimes does, transmit various signals, e.g., a transmission request signal, a pilot signal etc., to other peer communications devices, e.g., second device 104. It should be appreciated that the same transmitter module transmits traffic data, at various points in time during the operation. The data may include user data, e.g., peer to peer traffic data conveying text, audio, and/or image data.

Resource identification module 1022 is for identifying, a first subset of communications resources on which a signal of interest was communicated, out of a larger set of communications resources. For example the first subset may be, e.g., a first subset of tone-symbols 464, and the larger set of communications resources may be, e.g., larger set 462, as shown in FIG. 4. In some embodiments, the resource identification module 1022 includes a device identifier based selection sub-module 1024 configured to select, as said first subset, resources corresponding to a device identifier of said communications device 1000. In some embodiments the resource identification module 1022 also includes or alternatively includes, a connection identifier based selection sub-module 1026 configured to select, as said first subset, resources corresponding to a connection identifier corresponding to a communication connection to which said communications device 1000 is a party. It should be appreciated that a connection identifier may correspond to, e.g., the pair of communicating peer devices. For example, the connection identifier may correspond to and be known to both, the communications device 1000 and other peer device, e.g., second device 104, which may be communicating with the communications device 1000.

Reliability determination module 1028 is for determining, based on the received energy corresponding to individual sub-portions of the first subset of the set of communications resources, if one or more sub-portions of the received signal of interest 1020 are reliable. In some embodiments, the received signal of interest 1020 may be, e.g., a control signal communicating a control value in the form of a codeword, where the communicated value in the form of codeword communicates e.g., a transmission rate, and/or an ACK/NAK signal. In some embodiments, the signal of interest may, and sometimes is, received on an identified first subset of communications resources. In some embodiments, the communications resources are individual tone-symbols. The reliability determination module 1028 includes an average power estimation module 1030 and a threshold comparison module 1032. The average power estimation module 1030 estimates the average power per signal sub-portion corresponding to the first subset of communications resources. For example, the module 1030 may consider signal power on each individual tone-symbol corresponding to the first subset of communications resources in generating the average power.

The threshold comparison module 1032 determines which sub-portions have a sub-portion signal power within a threshold range of said estimated average power, as indicated by the outcome of a comparison to a threshold range based on the estimated average power. The threshold range may be a predetermined range relative to the estimated average power or may be a dynamically generated range, generated by the communications device 1000 depending on, e.g., quality of the received signal. Using the result produced by threshold comparison module 1032, said sub-portions determined to have a sub-portion signal power within a threshold range of said average power may, and sometimes are, considered as reliable. Tone-symbols of the sub-portion which are not determined to be reliable are considered unreliable. The output of the reliability determination module 1028 is stored as determined reliable sub-portions 1048.

Interference level determination module 1034 is for generating an interference level from a second subset of the larger set communications resources 462, the second subset including communications resources, e.g., tone-symbols, which are not included in the first subset of communications resources 464. For example, the second subset may be, e.g., communications resources not in first subset identified by reference 466 in FIG. 4. An interference level may be determined, e.g., to be based on the average per tone-symbol energy received on the tone-symbols included in the second subset or some function thereof.

Signal recovery module 1036 is for recovering a communicated control signal, from the sub-portions of the received signal of interest which are determined to be reliable. The reliable sub-portions, e.g., tone-symbols included in the first subset of communication resources which are determined to be reliable, communicate, e.g., a control signal or other information. In some embodiments, the communicated control signal is encoded using positional encoding with the position of tone-symbols in the first subset on which energy is transmitted being used to communicate the value being transmitted. In some embodiments, the communicated control signal is one of an acknowledgment (ACK) value and a negative acknowledgment (NAK) value. In some embodiments, the communicated control signal communicates one of a plurality of possible transmission rate indicator values. The signal recovery module 1036 includes a positional decoding module 1038 to perform a positional decoding operation based on the position of tone-symbols in the first subset of resources which are determined to be reliable. In some such embodiments, the positional decoding module includes a pattern matching module 1040 for comparing the position of tone-symbols in the first subset on which energy above an interference level is detected to a set of tone-symbol patterns, each tone-symbol pattern being used to communicate at least one value. For example, since an interference level is determined using module 1034, the device 1000 identifies which tone-symbols in the first subset have an energy, above the determined interference level which can be considered indicative of energy from the communicated signal. The pattern matching module 1040 compares the position of such identified tone-symbols to a plurality of possible patterns used to communicate values. When a certain tone-symbol pattern matches, the device 1000 may conclude as to what value has been communicated by the control signal.

In some embodiments, the positional decoding module 1038 is configured to perform positional decoding without the use of information indicating the position of tone-symbols in the first subset which are not determined to be reliable, e.g., without use of the unreliable tone-symbols. In some embodiments, the positional decoding module 1038 also includes a probability matching sub-module 1042.

Received signals 1044 represent signal received by the communications device 1000 via the wireless receiver module 1002, e.g., signal received on the larger set of communications resources 462. Individual received signal 1044, may include a signal of interest 1020. In some embodiments, the signal of interest may be, e.g., a control signal, communicated from a peer communications device such as second device 104. Identified first subset of resources 1046 includes information as to which communication resources out of the larger set 462 have been identified to belong to the first subset of resources, e.g., first subset 464. The identified first subset of resources 1046 is an output of the resource identification module 1022.

Determined reliable sub-portions 1048 include information as to which sub-portions, e.g., tone-symbols, of the first subset of communications resources 464 are determined to be reliable. As discussed above, using the average power estimation module 1030 and threshold comparison module 1032, the communications device 1000 determines the reliable sub-portions of the signal of interest. Thus, the determined reliable sub-portions 1048 is an output of the reliability determination module 1028 which includes, in some embodiments, both modules 1030 and 1032.

Recovered signal 1050 is the recovered signal of interest, e.g., the communicated control signal, which was communicated from the other peer communications device. The recovered signal 1050 is the output of the signal recovery module 1036. Estimated average power 1052 is the generated estimate of the average power per signal sub-portion corresponding to the first subset of communications resources. The estimated average power 1052 is an output of the average power estimation module 1030 and may be taken as an input to the threshold comparison module 1032.

Threshold range information 1054 includes information regarding the threshold ranges that can be used by the threshold comparison module 1032. Thus the threshold range information 1054 acts as an input to the threshold comparison module 1032. The determined interference level 1058 is the interference level determined from the second subset of communications resources which are not included in the first subset of communications resources. Determined interference level 1058 is an output of the determination module 1034.

Stored tone-symbol patterns 1060 include a plurality of tone-symbols patterns and information on the values corresponding to the individual patterns which may, and sometimes are, used by the communications device 1000 for comparing the position of tone-symbols in said first subset on which energy above the determined interference level 1058 is detected. Each of the tone-symbols patterns in the stored tone-symbol patterns 1060 corresponds to at least one value, e.g., a value which may be communicated using positional encoding.

The device identifier 1062 may be, e.g., an identifier of the communications device 1000, e.g., first device 102. Among other things, the device identifier 1062 may also be used, in some embodiments, by the resource identification module 1022 while identifying the first subset of resources that correspond to the device identifier. The connection identifier 1064 may be used by the resource identification module 1022 while identifying the first subset of resources that correspond to the connection identifier. As discussed earlier, the connection identifier 1064 may correspond to, e.g., a pair of communicating peer devices, e.g., the first and second devices 102, 104.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Thus, in some embodiments, the modules are physical hardware modules. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM systems including, e.g., CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A communications method, comprising:
   identifying a first subset of communications resources out of a larger set of communications resources;
   receiving on the larger set of communications resources a signal, said signal including a first signal portion and a second signal portion, said first signal portion being received on said first subset of communications resources, said second signal portion being received on communications resources in said larger set of communications resources which are not included in said first subset of communications resources;

determining based on received energy corresponding to individual sub-portions of said first signal portion, if one or more of said individual sub-portions of said first signal portion are reliable; and generating a channel quality estimate based on the individual sub-portions of the first signal portion which are determined to be reliable and the second signal portion.

2. The method of claim 1, wherein said communications resources are individual tone-symbols.

3. The method of claim 1, wherein identifying a first subset of communications resources includes:

selecting, as said first subset, resources corresponding to a device identifier of a peer to peer communications device implementing said method.

4. The method of claim 1, wherein identifying a first subset of communications resources includes:

selecting, as said first subset, resources corresponding to a connection identifier corresponding to a peer to peer communications device implementing said method.

5. The method of claim 1, wherein determining based on the received energy corresponding to individual sub-portions of the first signal portion if one or more of said individual sub-portions of the first signal portion are reliable includes:

generating an estimate of the average power per signal sub-portion corresponding to the first signal portion of said signal corresponding to the first subset of communications resources; and determining that sub-portions having a sub-portion signal power within a threshold range of said average power are reliable.

6. The method of claim 1, wherein generating a channel quality estimate based on the individual sub-portions of the first signal portion determined to be reliable and the second signal portion includes:

generating a power estimate of a signal of interest based on the individual sub-portions of the first signal portion determined to be reliable.

7. The method of claim 6, wherein generating a channel quality estimate based on the individual sub-portions of the first signal portion determined to be reliable and the second signal portion further includes:

generating a power estimate of interference based on received energy of the second signal portion of said signal.

8. The method of claim 7, wherein generating a channel quality estimate further includes:

generating a ratio of said power estimate of the signal of interest and the power estimate of interference.

9. The method of claim 7, further comprising:
identifying a second set of communications resources; and
transmitting, on the second set of communications resources, the channel quality estimate to a peer communications device from which said signal of interest was received.

10. The method of claim 7, further comprising:
selecting a transmission rate to be used for data transmission by a peer communications device from which a signal of interest was received.

11. The method of claim 10, further comprising:
identifying a second set of communications resources; and
transmitting to a peer communications device from which the signal of interest was received, on the second set of communications resources, the rate to be used for data transmission.

12. A communications device, comprising:

a resource identification module configured to identify a first subset of communications resources out of a larger set of communications resources;

a receiver configured to receive a signal on the larger set of communications resources, said signal including a first signal portion and a second signal portion, said first signal portion being received on said first subset of communications resources, said second signal portion being received on communications resources in said larger set of communications resources which are not included in said first subset of communications resources;

a reliability determination module configured to determine based on the received energy corresponding to individual sub-portions of the first signal portion if one or more of said individual sub-portions of the first signal portion are reliable; and a channel quality estimate generation module configured to generate a channel quality estimate based on the individual sub-portions of the first signal portion which are determined to be reliable and the second signal portion.

13. The communications device of claim 12, wherein said communications resources are individual tone-symbols.

14. The communications device of claim 12, wherein the resource identification module includes:

a device identifier based selection sub-module configured to select, as said first subset, resources corresponding to a device identifier of said communications device.

15. The communications device of claim 12, wherein the resource identification module includes:

a connection identifier based selection sub-module configured to select, as said first subset, resources corresponding to a connection identifier corresponding to said communications device.

16. The communications device of claim 12, wherein said reliability determination module includes:

an average power estimation module for estimating the average power per signal sub-portion corresponding to the first signal portion of said signal corresponding to the first subset of communications resources; and a threshold comparison module for determining which individual sub-portions have a sub-portion signal power within a threshold range of said average power, said individual sub-portions determined to have a sub-portion signal power within a threshold range of said average power being determined to be reliable.

17. The communications device of claim 12, wherein said channel quality estimate generation module includes:

a signal of interest power estimation module for generating a power estimate of a signal of interest based on the individual sub-portions of said first signal portion determined to be reliable.

18. The communications device of claim 17, wherein said channel quality estimate generation module further includes:

an interference estimation module configured to generate a power estimate of interference based on received energy of the second signal portion of said signal.

19. The communications device of claim 18, wherein said channel quality estimate generation module includes:

a signal power to interference ratio generation module configured to generate a ratio of said power estimate of the signal of interest and the power estimate of interference.

20. The communications device of claim 18, further comprising:

a control resource determination module for selecting a second set of communications resources to be used for communicating control signals; and a transmitter module configured to transmit on the second set of communications resources, a generated channel quality estimate to a peer communications device from which said signal of interest was received.

21. The communications device of claim 18, further comprising:

a transmission rate selection module configured to select a transmission rate to be used for data transmission by a peer communications device from which a signal of interest was received.

22. The communications device of claim 21, further comprising:

a control resource determination module for selecting a second set of communications resources to be used for communicating control signals; and a transmitter module configured to transmit to a peer communications device from which said signal of interest was received, on the second set of communications resources, the rate to be used for data transmission.

23. A communications device, comprising:

resource identification means for identifying a first subset of communications resources out of a larger set of communications resources;

receiver means for receiving a signal on the larger set of communications resources, said signal including a first signal portion and a second signal portion, said first signal portion being received on said first subset of communications resources, said second signal portion being received on communications resources in said larger set of communications resources which are not included in said first subset of communications resources;

reliability determination means for determining, based on the received energy corresponding to individual sub-portions of the first signal portion, if one or more sub-portions of the first signal portion are reliable; and channel quality estimate generation means for generating a channel quality estimate based on the individual sub-portions of said first signal portion which are determined to be reliable and the second signal portion.

24. The communications device of claim 23, wherein said communications resources are individual tone-symbols.

25. The communications device of claim 23, wherein the resource identification means includes:

device identifier based selection means for selecting, as said first subset, resources corresponding to a device identifier of said communications device.

26. A computer program product for use in a communications device, comprising:

non-transitory computer readable medium having code stored thereon, which when executed control a computer to:

identify a first subset of communications resources out of a larger set of communications resources;

receive on the larger set of communications resources a signal, said signal including a first signal portion and a second signal portion, said first signal portion being received on said first subset of communications resources, said second signal portion being received on communications resources in said larger set of communications resources which are not included in said first subset of communications resources;

determine based on the received energy corresponding to individual sub-portions of the first signal portion if one or more sub-portions of the first signal portion are reliable; and generate a channel quality estimate based on the individual sub-portions of said first signal portion which are determined to be reliable and the second signal portion.

27. The computer program product of claim 26, wherein the non-transitory computer readable medium further having code stored thereon, which when executed control a computer to:

select, as said first subset, resources corresponding to a device identifier of the communications device.

28. The computer program product of claim 26, wherein the non-transitory computer readable medium further having code stored thereon, which when executed control a computer to:

select, as said first subset, resources corresponding to a connection identifier corresponding to the communications device.

* * * * *